(12) United States Patent
Aoki

(10) Patent No.: US 8,144,440 B2
(45) Date of Patent: Mar. 27, 2012

(54) ELECTRIC APPLIANCE AND HEATING COOKING DEVICE

(75) Inventor: Yasuchika Aoki, Nara (JP)

(73) Assignee: Panasonic Corporation, Osaka (JP)

( * ) Notice: Subject to any disclaimer, the term of this patent is extended or adjusted under 35 U.S.C. 154(b) by 521 days.

(21) Appl. No.: 12/064,410

(22) PCT Filed: Aug. 25, 2006

(86) PCT No.: PCT/JP2006/316768
§ 371 (c)(1),
(2), (4) Date: Feb. 21, 2008

(87) PCT Pub. No.: WO2007/023961
PCT Pub. Date: Mar. 1, 2007

(65) Prior Publication Data
US 2009/0147413 A1 Jun. 11, 2009

(30) Foreign Application Priority Data

Aug. 26, 2005 (JP) ................................. 2005-245618
Nov. 24, 2005 (JP) ................................. 2005-338210
Apr. 3, 2006 (JP) ................................. 2006-101760

(51) Int. Cl.
*H02H 3/16* (2006.01)
(52) U.S. Cl. ........................................................ 361/42
(58) Field of Classification Search ....................... 361/42
See application file for complete search history.

(56) References Cited

U.S. PATENT DOCUMENTS 6,331,699 B1* 12/2001 Ito et al. ......................... 219/715
2002/0008950 A1* 1/2002 Kim et al. ......................... 361/42
2005/0237680 A1* 10/2005 Egner .............................. 361/42

FOREIGN PATENT DOCUMENTS

EP         1003353 A2      5/2000
(Continued)

OTHER PUBLICATIONS

International Search Report for PCT/JP2006/316768 dated Nov. 1, 2006.

(Continued)

*Primary Examiner* — Stephen W Jackson
*Assistant Examiner* — Angela Brooks
(74) *Attorney, Agent, or Firm* — Pearne & Gordon LLP

(57) ABSTRACT

An appliance comprises: an appliance main body for employing an AC power supply, and a power supply unit, which outputs a DC voltage and an AC voltage to the appliance main body as power supply voltages. The power supply unit comprises: a power supply circuit for converting the input AC into DC, which is insulated from the AC power supply; relays for turning ON and OFF a supply of the AC power supply voltage; and an earth leakage sensing circuit provided between contact points of the relays and the appliance main body, for turning OFF the relays while earth leakage is sensed. While the earth leakage occurs, the sensing circuit turns OFF the relays so as to stop the supply of the AC voltage. It is possible to avoid a failure caused by earth leakage in advance, and also, the relays are turned OFF during a standby mode.

20 Claims, 11 Drawing Sheets

FOREIGN PATENT DOCUMENTS

| | | |
|---|---|---|
| EP | 1420615 A1 | 5/2004 |
| JP | 55-32475 | 3/1980 |
| JP | 58-175282 | 10/1983 |
| JP | 01-309288 | 12/1989 |
| JP | 4-17639 | 2/1992 |
| JP | 10-261483 A | 9/1998 |
| JP | 2000-304278 | 11/2000 |
| JP | 2003-059633 | 2/2003 |
| JP | 2003-223841 | 8/2003 |
| JP | 2003-234171 A | 8/2003 |
| JP | 2004-178964 | 6/2004 |

OTHER PUBLICATIONS

European Search Report for PCT/JP2006-316768 dated Feb. 21, 2011.

* cited by examiner

ELECTRIC APPLIANCE AND HEATING COOKING DEVICE

TECHNICAL FIELD

The present invention is related to an electric appliance capable of reducing power consumption in a standby mode, in particular, a safety device capable of preventing either earth leakage or an electric shock of the electric appliance. Also, the present invention is related to an electric appliance capable of reducing power consumption in the standby mode, in particular, a safety device capable of preventing either earth leakage or an electric shock of a cooking device utilizing water and/or generating steam.

BACKGROUND ART

Conventionally, in electric appliances such as microwave ovens, while earth terminals are provided with main bodies of these microwave ovens, the earth terminals are grounded during operations in order to avoid such a risk that users may suffer from electric shock failures. Also, there are some microwave ovens equipped with earth leakage cut off functions, assuming the case that earth terminals provided with main bodies of microwave ovens are not firmly grounded.

FIG. 11 shows a circuit diagram of the above-described microwave oven. As shown in FIG. 11, the microwave oven is arranged by a magnetron 104, a control board 106, a relay 107, and a zero phase current transformer 108. The magnetron 104 oscillates with a power supply that comprises a high voltage transformer 101, a capacitor 102, and a diode 103. The control board 106 operates receiving electric power supplied by a low voltage transformer 105. The relay 107 opens and closes a connection between a power supply and a high voltage transformer 101. The zero phase current transformer 108 is provided on a power supply line between the power supply and the relay 107. Since the relay 107 operates receiving a control signal supplied from the control board 106 so as to supply the electric power to the high voltage transformer 101, the magnetron 104 oscillates to heat food. Also, the control board 106 monitors an unbalance current detected by the zero phase current transformer 108 in order to detect earth leakage. When the earth leakage is detected, the control board 106 immediately opens the relay 107 in order to cut off an earth leakage current (refer to patent publication 1).

Patent Publication 1: JP-A-58-175282

DISCLOSURE OF THE INVENTION

<Problem that the Invention is to Solve>

However, in the conventional arrangement of the microwave oven, since the low voltage transformer 105 is mounted on the control board 106, as to earth leakage caused by deteriorations of insulation occurred inside the control board 106, there is such a problem that the earth leakage cut off function cannot be sufficiently realized. Also, in recent year, while microwave ovens equipped with oven functions have been mainly marketed, relays and the like, which turn ON/OFF heaters are furthermore arranged on control boards, and thus, the control boards themselves are made complex and in large scales. As a result, higher costs are necessarily required in order to improve insulating performance of the control board themselves, as compared with that of the conventional microwave ovens.

Further, very recently, there is a general need to suppress standby power of microwave ovens to 1 W, or lower than 1 W. Moreover, in microwave ovens which are not equipped with a clock function, it is so required that standby power thereof is reduced to 50 mW, or lower than 50 mW, namely, various ideas have grappled with such a need that standby power is approached to essentially zero power. In the above-described conventional arrangements, the electric power is continuously supplied to the circuits for detecting the earth leakage provided on the control board. Thus, even electric power consumed in the detecting circuits themselves cannot be neglected. In addition, since the circuits for detecting the earth leakage also operates, there is another problem that the standby power can be hardly suppressed lower than, or equal to 50 mW. Also, there is a further problem that in an electric appliance where a metal is used as an outer housing thereof, when earth leakage occurs between a control board and a metal portion of the outer housing, the earth leakage cannot be avoided without pulling out a plug.

The present invention is made to solve the above-described conventional problems, and has an object to provide an electric appliance equipped with a safety device capable of preventing either earth leakage or an electric shock. Also, the present invention has another object to provide a heating cooking device which is equipped with the safety device capable of preventing either the earth leakage or the electric shock, and also is capable of reducing power consumption when the heating cooking device is in the standby mode.

<Means for Solving the Problems>

To solve the above-described conventional problems, an electric appliance, according to the present invention, comprising: an appliance main body for employing an AC power supply; and a power supply unit to which the AC power supply provided in the appliance main body is connected as an input power supply, which outputs a DC voltage and an AC voltage to the appliance main body as power supply voltages; wherein the power supply unit comprises: a power supply circuit for converting the input AC power supply voltage into a DC power supply voltage, which is electrically insulated from the AC power supply; and a relay for starting or stopping a supply of the AC power supply voltage to the appliance main body.

As a result, since the supply of the AC voltage to the appliance main body is stopped, the relay is turned OFF, so that the AC power supply can be cut off from the apparatus main body except for the power supply unit.

Also, the power supply unit of the electric appliance of the present invention is provided with an earth leakage sensing circuit provided between a terminal of the relay and the appliance main body, for detecting earth leakage occurred in the appliance main body to turn OFF the relay.

As a consequence, while the earth leakage occurs in the appliance main body, the earth leakage sensing circuit turns OFF the relay so as to stop the supply of the AC voltage to the appliance main body. As a result, it is possible to avoid a failure caused by the earth leakage in advance.

Also, the electric appliance of the present invention turns OFF the relay when the electric appliance is in the standby mode.

As a result, the electric power for turning ON the relay can be eliminated, so that unnecessary power consumption of the electric appliance can be eliminated.

Also, in such a standby mode that the user does not use the electric appliance, the AC voltage is not applied to the unnecessary portions of the appliance main body, resulting in safer operation.

Also, the electric appliance of the present invention is provided with a control unit for controlling the electric appliance; and the control unit operates receiving the DC voltage applied from the power supply unit and controls the supply of the DC voltage to both the relay and the earth leakage sensing circuit.

As a consequence, when such a relay having a higher possibility where earth leakage occurs in the appliance main body is being turned ON, the DC voltage for the earth leakage sensing circuit can be applied to reduce the unnecessary power consumption.

Also, when the electric appliance is in the standby mode, the control unit of the electric appliance of the present invention stops to supplying the DC voltage to both the relay and the earth leakage sensing circuit.

As a consequence, in such a standby mode where the AC voltage is not required, the DC voltages to the relay and the earth leakage sensing circuit can be stopped to reduce the unnecessary power consumption.

Also, the power supply unit of the electric appliance of the present invention is provided with a noise filter circuit on the input side of the AC power supply, and the power supply unit is provided as a single unit.

As a consequence, since the portions where the earth leakage cannot be detected are collected to the power supply unit, such a risky aspect that the earth leakage occurs in the power supply unit is considerably improved, so that security of the entire electric appliance can be improved.

Further, a heating cooking device, according to the present invention, comprises: a load; control means for controlling the load; a power supply unit of the control means; an electric power supplying unit for supplying electric power from the power supply unit to the control means; an initiation signal generating unit for applying a signal to the electric power supplying unit so as to commence the supply of the electric power; an electric wire for applying a commercial power supply voltage to both the load and the power supply unit; a current detecting unit for detecting an unbalance current flowing through the electric wire; and an earth leakage judging unit for judging whether or not earth leakage is present based upon a signal output from the current detecting unit; wherein when the electric power supplying unit does not supply the electric power in the standby mode, the supply of the power supply voltage is commenced in response to the signal of the initiation signal generating unit, so that the control means and the earth leakage judging unit start the operations thereof; and also, if the signal of the earth leakage judging unit is normal, then the supply of the electric power by the electric power supplying unit is continuously carried out, so that the subsequent operations of the control means and the earth leakage judging unit are continuously carried out, and also, the electric power supplying unit stops supplying the electric power.

As a consequence, since the supply of the electric power to both the control means and the earth leakage judging unit is stopped in the standby mode, the power consumption in the control means and the earth leakage judging unit can be eliminated.

Also, the control means of the heating cooking device of the present invention comprises a power switch having a reset function, for opening/closing a connection between the load and the power supply unit; and when the signal of the earth leakage judging unit is not normal, the control means opens the power switch.

As a consequence, even when the earth leakage happens to occur in either the power supply unit or the control means, the switching device is turned OFF in order to stop the energization. As a result, it is possible to avoid an electric shock.

Also, an electric appliance, according to the present invention, comprises: a load; control means for controlling the load; an electric wire for applying a power supply voltage to both the load and the control means; a current detecting unit for detecting an unbalance current flowing through the electric wire; an earth leakage judging unit for judging whether or not earth leakage is present based upon a signal output from the current detecting unit; a main switching device for opening/closing the electric wire; and a switch connected parallel to the main switching device; wherein during such a standby mode that the main switching device is opened, the switch is closed so as to commence the supply of the power supply voltage, so that the control means commences the control operation thereof; when the earth leakage judging means judges that earth leakage does not occur, since the control means closes the main switching device, even when the switch is opened, the subsequent operation of the control means is continued, and the control means opens the main switching device to transfer into the standby mode.

As a consequence, since the supply of the electric power to the control means is stopped in the standby mode, the power consumption in the control means can be eliminated. Also, even when the earth leakage happens to occur in either the load or the control means, since the main switching device is turned OFF, it is possible to avoid the electric shock.

Also, the electric appliance of the present invention is equipped with notifying means; and when the earth leakage judging means judges that the earth leakage occurs, the control means performs notification, and opens the main switching device.

As a consequence, the electric appliance can notify such a fact that the earth leakage has occurred to the user.

Also, the electric appliance of the present invention is equipped with storage means and notifying means; and when the earth leakage judging means judges that the earth leakage occurs, the control means stores the information of the earth leakage in the storage means, and also, even when the earth leakage judging means judges that the earth leakage does not occur, the information of the earth leakage stored in the storage means is notified.

As a consequence, since the operating mode where the earth leakage has occurred can be stored in the storage means, this operating mode can provide a hint for repairing the earth leakage occurring place.

Also, the electric appliance of the present invention is equipped with a microcomputer; and the microcomputer is equipped with an examination program for operating the load connected to the electric wire under a predetermined condition so as to check whether or not the judgement made by the earth leakage judging means is normal, and the microcomputer executes the examination program by a predetermined operation.

As a consequence, the electric appliance can confirm whether or not the earth leakage is present in all of the loads coupled to the electric wire by a simple operation.

<Advantage Of The Invention>

The electric appliance of the present invention is equipped with the safety device capable of preventing either the earth leakage or the electric shock, and can reduce power consumption when the electric appliance is in the standby mode.

Figure 1:
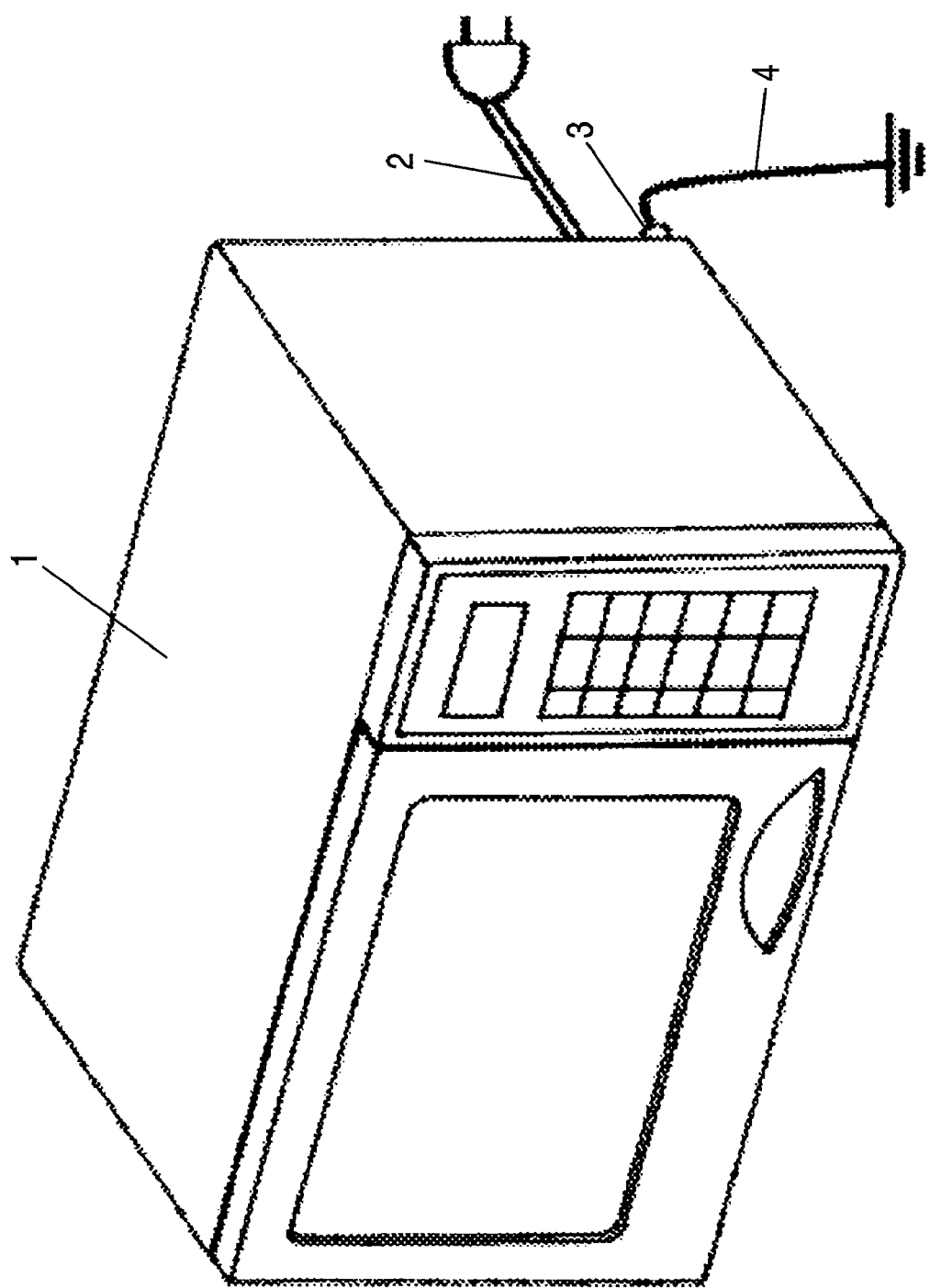
FIG. 1 is an outer view of a microwave oven according to an embodiment 1 of the present invention.

DESCRIPTION OF REFERENCE NUMERALS AND SIGNS 1 appliance main body
2 power supply wire
3 earth terminal
4 earth line
5 AC power supply
6 power supply unit
8a, 8b relay
9 noise filter circuit
10 earth leakage sensing circuit
11 control unit
12 switch
13 resistor
14 transistor
15 transformer
16 zero phase current converter
17 judging circuit
1008a electric wire
1010a high frequency generator (load)
1010b heater (load)
1011a, 1011b, 1011c, 1011d relay (switching device)
1013 microcomputer (control means)
1014 AC/DC converter (power supply unit)
1015 zero phase current transformer (current detecting unit)
1016 earth leakage judging unit;
1017 power supply voltage applying unit
1019 initiation signal generating unit
1020 door switch
1025 power supply switch
2004 display unit (notifying means)
2009a electric wire
2010, 2025 relay (main switching)
2012 high frequency generator (load).
2013 control means
2015 microcomputer
2016 storage means
2018 zero phase current transformer (current detector)
2019 earth leakage judging means
2010 switch
2022 heater (load)

BEST MODE FOR CARRYING OUT THE INVENTION

First invention is such an electric appliance which comprises: an appliance main body for employing an AC power supply; and a power supply unit to which the AC power supply provided in the appliance main body is connected as an input power supply, which outputs a DC voltage and an AC voltage to the appliance main body as power supply voltages; wherein the power supply unit comprises: a power supply circuit for converting the input AC power supply voltage into a DC power supply voltage, which is electrically insulated from the AC power supply; and a relay for starting or stopping a supply of the AC power supply voltage to the appliance main body. As a result, since the supply of the AC voltage to the appliance main body is stopped, the relay is turned OFF, so that the AC power supply can be cut off from the apparatus main body except for the power supply unit, resulting in safer operation.

In second invention, more specifically, the power supply unit of the first invention is provided with an earth leakage sensing circuit provided between a contact point of the relay and the appliance main body, for detecting earth leakage occurred in the appliance main body to turn OFF the relay. As a consequence, while the earth leakage occurs in the appliance main body, the earth leakage sensing circuit turns OFF the relay so as to stop the supply of the AC voltage to the appliance main body. As a result, it is possible to avoid a failure caused by the earth leakage in advance.

In third invention, more specifically, the electric appliance of the second invention turns OFF the relay when the electric appliance is in the standby mode. As a result, the electric power for turning ON the relay can be eliminated, so that unnecessary power consumption of the electric appliance can be eliminated. Also, in such a standby mode that the user does not use the electric appliance, the AC voltage is not applied to the unnecessary portion of the appliance main body, resulting in safer operation.

In fourth invention, in particular, the appliance main body of the second invention is provided with a control unit for controlling the electric appliance; and the control unit operates receiving the DC voltage applied from the power supply unit and controls to turn ON/OFF the supply of the DC voltage to both the relay and the earth leakage sensing circuit. As a consequence, when such a relay having a higher possibility where earth leakage occurs in the appliance main body is being turned ON, the DC voltage for the earth leakage sensing circuit can be started, so as to reduce the unnecessary power consumption.

In fifth invention, more specifically, when the electric appliance is in the standby mode, the control unit of the fourth invention turns OFF the supply of the DC voltage to both the relay and the earth leakage sensing circuit. As a consequence, in such a standby mode where the AC voltage is not required, the DC voltages to the relay and the earth leakage sensing circuit can be stopped, so that the unnecessary power consumption can be reduced.

In sixth invention, more specifically, the power supply unit of the second invention is provided with a noise filter circuit on the input side of the AC power supply, and the power supply unit is provided as a single unit. As a consequence, since the portions where the occurrences of the earth leakage cannot be detected are collected to the power supply unit, such a risky aspect that the earth leakage occurs in the power supply unit is considerably improved, so that security as the entire electric appliance can be improved.

Seventh invention is such a heating cooking device which comprises: a load; control means for controlling the load; a power supply unit of the control means; an electric power supplying unit for supplying electric power from the power supply unit to the control means; an initiation signal generating unit for applying a signal to the electric power supplying unit so as to commence the supply of the electric power; an electric wire for applying a commercial power supply voltage to both the load and the power supply unit; a current detecting unit for detecting an unbalance current flowing through the electric wire; and an earth leakage judging unit for judging whether or not earth leakage is present based upon a signal output from the current detecting unit; wherein in such a standby mode that the electric power supplying unit does not supply the electric power, the supply of the power supply voltage is commenced in response to the signal of the initiation signal generating unit, so that the control means and the earth leakage judging unit start the operations thereof; and also, if the signal of the earth leakage judging unit is normal, then the supply of the electric power by the electric power supplying unit is continuously carried out, so that the subsequent operations of the control means and the earth leakage judging unit are continuously carried out, and also, the electric power supplying unit stops supplying the electric power when earth leakage does not occur, but also, the operation is not advanced for a predetermined time. As a result, the power consumption in both the control means and the earth leakage judging unit can be eliminated so as to reduce the power consumption in the standby mode.

In eighth invention, more specifically, while a door switch operating in cooperation with opening/closing operations of a door is provided in the initiation signal generating unit of the seventh invention, the signal is generated by opening or closing the door switch. As a result, the power supply starts with necessary opening/closing operations of the door when a material to be cooked is heating-cooked while the power ON switch is not employed, so that the user friendly function is not deteriorated.

In ninth invention, more specifically, the heating cooking device of the seventh invention is provided with a switching device for opening/closing a connection between the load and the electric wire; and in the case that the signal of the earth leakage judging unit is not normal, the control means opens the switching device. Even when earth leakage happens to occur in the load, since the switching device is turned OFF, it is possible to avoid an electric shock.

In tenth invention, more specifically, the control means of the heating cooking device of the seventh invention is provided with a power switch having a reset function, for opening/closing a connection between the load and the power supply unit; and when the signal of the earth leakage judging unit is not normal, the control means opens the power switch. As a consequence, even when the earth leakage happens to occur in either the power supply unit or the control means, the switching device is turned OFF in order to stop the energization. As a result, it is possible to avoid an electric shock.

In 11th invention, more specifically, the heating cooking device of the seventh invention comprises: a power switch having a reset function, for opening/closing a connection between the load and the power supply unit; and a switching device for opening/closing a connection between the load and the electric wire; and wherein in the case that the signal of the earth leakage judging unit is not normal, the control means opens the switching device, and thereafter, when the signal of the earth leakage judging unit is not further normal, the control means opens the power switch. As a consequence, it is possible to predict whether the earth leakage occurs in the load or in both the power supply unit and the control means.

In 12th invention, more specifically, the heating cooking device of any one of the ninth invention to the 11th invention is provided with notifying means; and when the signal of the earth leakage judging unit is not normal, an occurrence of earth leakage is notified by the notifying means. For instance, since an error indication is displayed, an occurrence of earth leakage can be notified.

In 13th invention, more specifically, while the occurrence of the leakage is notified, the control means of the 12th invention does not stop supplying the electric power from the electric power supplying unit. As a result, the control means continues the notification without transferring into the standby mode.

14th invention is such an electric appliance which comprises: a load; control means for controlling the load; an electric wire for applying a power supply voltage to both the load and the control means; a current detecting unit for detecting an unbalance current flowing through the electric wire; an earth leakage judging unit for judging whether or not earth leakage is present based upon a signal output from the current detecting unit; a main switching device for opening/closing the electric wire; and a switch connected parallel to the main switching device; wherein during such a standby mode that the main switching device is opened, the switch is closed so as to commence the supply of the power supply voltage, so that the control means commences the control operation thereof; when the earth leakage judging means judges that earth leakage does not occur, since the control means closes the main switching device, even when the switch is opened, the subsequent operation of the control means is continued, and since the control means opens the main switching device, the energization to the control means and the load is stopped. As a result, such a risky aspect that either earth leakage or an electric shock occurs can be reduced, and further, the power consumption during the standby mode can be decreased.

In 15th invention, more specifically, in the case that the earth leakage judging means judges that the earth leakage occurs, the control means of the 14th invention opens the main switching device, so that the energization to the control means and the load is stopped. As a result, such a risky aspect that either earth leakage or an electric shock occurs can be reduced, and further, the power consumption during the standby mode can be decreased.

In 16th invention, more specifically, in the case that there is no status transition for a predetermined time, the control means of the 14th invention opens the main switching device. As a result, the supply of the electric power to the control means is automatically stopped, so that an automatic power OFF function can be realized.

In 17th invention, more specifically, even when the predetermined time has not yet elapsed, in such a case that the earth leakage judging means judges that the earth leakage occurs, the control means of the 16th invention opens the main switching device. As a result, the energization to the control means and the load is stopped, so that such a risky aspect that either earth leakage or an electric shock occurs can be reduced.

In 18th invention, more specifically, since the control means of either the 14th invention or the 17th invention is equipped with notifying means, when the earth leakage judging means judges that the earth leakage occurs, the control means can perform notification, and can open the main switching device.

In 19th invention, more specifically, since the control means of the 14th invention is equipped with storage means, when the signal of the earth leakage judging means is not normal, the information of the earth leakage is stored in the storage means, so that the information can be derived from the control means.

In 20th invention, more specifically, since the control means of the 14th invention is equipped with both the storage means and the display means, when the earth leakage judging means judges that the earth leakage occurs, the control means stores the information of the earth leakage in the storage means, and also, when the signal of the earth leakage judging means is normal, the control means notifies the above-described information stored in the storage means. As a result, the user can grasp the occurrence of the earth leakage occurred in the past.

In 21st invention, more specifically, the control means of the 14th invention is equipped with a microcomputer; the microcomputer is equipped with an examination program for operating the load connected to the electric wire under a predetermined condition so as to check whether or not the judgement made by the earth leakage judging means is normal, and the microcomputer executes the examination program by a predetermined operation. As a result, the earth leakage examination can be carried out.

In 22nd invention, more specifically, the control means of the 21st invention is equipped with notifying means, so that a result of executing the examination program can be notified.

Referring now to drawings, a description is made of embodiments of the present invention. It should be understood that the present invention is not limited by the embodiments below.

(Embodiment 1)

FIG. 1 shows an outer view of a microwave oven according to a first embodiment of the present invention.

As shown in FIG. 1, a power supply wire 2 is provided in an appliance main body 1 and is to receive an AC power supply voltage from a commercial power supply. While an earth terminal 3 is provided on the main body 1, an earth line 4 is connected to the earth terminal 3 so as to earth the appliance main body 1. Since an outer housing of a microwave oven is covered with a metal, ground of the outer housing can avoid such a risk that an electric shock failure occurs so as to secure security.

Figure 2:
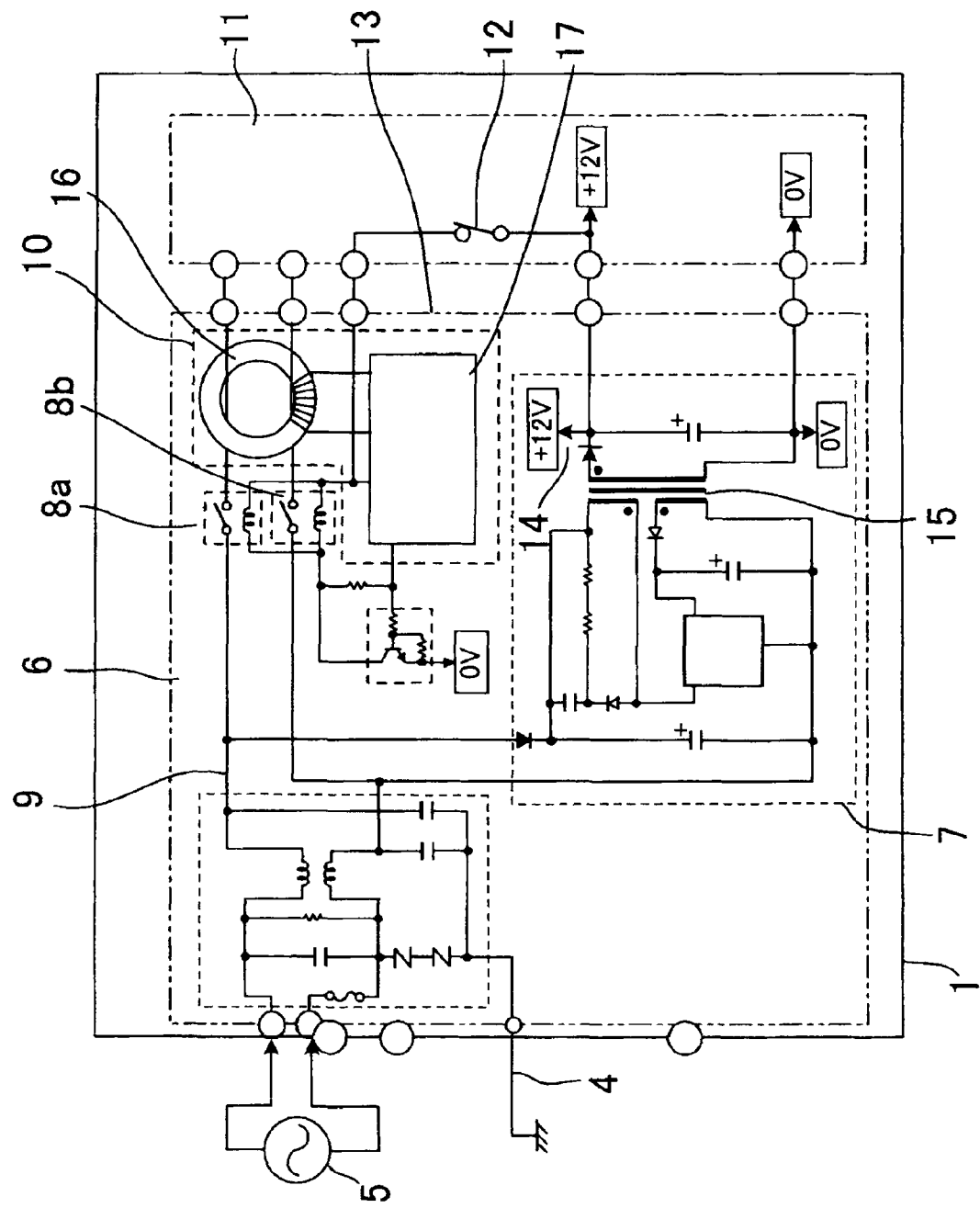
FIG. 2 is a circuit diagram of the microwave oven according to the first embodiment of the present invention.

FIG. 2 shows a circuit diagram of the microwave oven according to the first embodiment of the present invention.

As shown in FIG. 2, reference numeral 1 represents the apparatus main body, and shows such a condition that the metal portion of the outer housing is earthed by the earth line 4. Further, an AC power supply 5 is connected from the commercial power supply to the appliance main body 1. Reference numeral 6 indicates a power supply unit in which the AC power supply 5 is employed as an input power supply. In the power supply unit 6, a power supply circuit 7, relays 8a and 8b, a noise filter circuit 9, and an earth leakage sensing circuit 10 are provided on the same unit. The power supply circuit 7 converts an AC voltage from the AC power supply 5 into a DC voltage, which is electrically insulated from the AC power supply 5. The relays 8a and 8b turn ON/OFF a supply of the AC voltage that is employed as the power supply voltages of the internal units of the appliance main body 1. The noise filter circuit 9 is employed in order to suppress that noise generated from the internal units of the appliance is penetrated outside the appliance, and the noise filter circuit 9 is mounted, if required. As the power supply circuit 7, generally speaking, a switching power supply having a superior power converting efficiency is employed in the present embodiment. Alternatively, a low voltage transformer may be employed in the power supply circuit 7. Reference numeral 11 shows a control unit. Although not shown in FIG. 2, in the case of the microwave oven, the control unit 11 controls operations of the respective units of the appliance main body 1 such as a high frequency generator for electromagnetical heating operation, and a cooling fan motor.

A description is made of operations and effects with respect to the microwave oven which is provided in the above-described manner.

Firstly, when the AC voltage of the AC power supply 5 is applied by connecting the power supply wire 2 of the microwave oven to the commercial power supply, this AC voltage of the AC power supply 5 is entered to the power supply unit 6 in the first instance. The AC voltage of the AC power supply 5 is applied via the noise filter circuit 9 to one-sided contact points of the relays 8a and 8b and also to the power supply circuit 7. When the AC voltage of the AC power supply 5 is input to the power supply circuit 7, a DC voltage (+12 V) is produced as a power supply voltage of the control unit 11. The control unit 11 turns ON a switch 12 provided inside the control unit 11 in response to operating modes of the appliance so as to apply the power supply voltages for driving the relays 8a and 8b provided in the power supply unit 7. It should be understood that the switch 12 employed in this case may be arranged by employing a semiconductor, or by alternatively employing other means. When the DC voltage (+12 V) for driving the relays 8a and 8b, currents flowing through the coils of the relays 8a and 8b flow through a resistor 13 to a base of a transistor 14, and thus, the transistor 14 is turned ON, so that the contact points of the relays 8a and 8b are continuously turned ON. As previously described, the AC power is supplied to the control unit 11 due to the function of the control unit 11 if required, so that the supply of the AC power as the power supply voltage for driving the respective units provided inside the appliance main body 1 is controlled.

With employment of these arrangements, the supply of the AC power to the respective units provided inside the appliance main body 1 is stopped, so that since the relays 8a and 8b are turned OFF, the AC power supply 5 can be cut off from the appliance main body 1 except for the power supply unit 6. Also, since the DC voltage (+12 V) being applied to the control unit 11 has also been insulated by a transformer 15 which constitutes the power supply circuit 7, the control unit 11 is similarly and electrically insulated from the AC power supply 5, resulting in a safer structure. Moreover, since the circuit portions to which the AC power voltage of the AC power supply 5 is continuously applied are grouped in the power supply unit 6, such circuit portions having higher risky possibilities of earth leakage can be grouped, so that solutions capable of preventing the earth leakage can be readily taken with respect to a structural aspect.

Next, a description is made of operations of the earth leakage sensing circuit 10. Reference numeral 16 is a zero phase current transformer. The zero phase current transformer 16 detects a difference between an incoming AC current and an outgoing AC current, and generates a voltage in response to the difference. Reference numeral 17 shows a judging circuit. The judging circuit 17 judges that earth leakage occurs when an output voltage from the zero phase current transformer 16 exceeds a predetermined threshold value, and outputs a judgement result. In the case of the present embodiment, when the judging circuit 17 judges the occurrence of the earth leakage, the judging circuit 17 outputs a signal having a "0 V" level to the base terminal of the transistor 14 so as to turn OFF the transistor 14, so that the judging circuit 17 turns OFF the relays 8a and 8b.

As a consequence, while the earth leakage occurs inside the appliance main body 1, the earth leakage sensing circuit 10 turns OFF the relays 8a and 8b in order to stop supplying the AC power to the internal units of the appliance main body 1, so that it is possible to avoid a failure caused by the earth leakage in advance.

Also, in the present embodiment while the relays 8*a* and 8*b* are turned OFF, the supply of the AC power to the respective units of the appliance main body 1 is stopped. As a result, in such a standby mode that the microwave oven is not used, since the relays 8*a* and 8*b* are turned OFF, while it is possible to prevent the failure caused by the earth leakage, the electric power consumed in the relays 8*a* and 8*b* can be reduced, and thus, the safer circuit arrangement with lower power consumption can be realized.

In addition, while the relays 8*a* and 8*b* are turned OFF, since there is no need for sensing the earth leakage, the supply of the power supply voltage to the earth leakage sensing circuit 10 is stopped, so that unnecessary power consumption can be suppressed, and the power consumption can be furthermore reduced. In the present embodiment, the appliance main body 1 is arranged in such a manner that the supplies of the DC voltage (+12 V) to the relays 8*a*, 8*b*, and the earth leakage sensing circuit 10 are started/stopped at the same time by operating the switch 12 of the control circuit 11, namely, has explained such a case that the drive circuit is made simple. Alternatively, the supplies of the DC voltage (+12 V) may be separately controlled.

(Embodiment 2)

Figure 3:
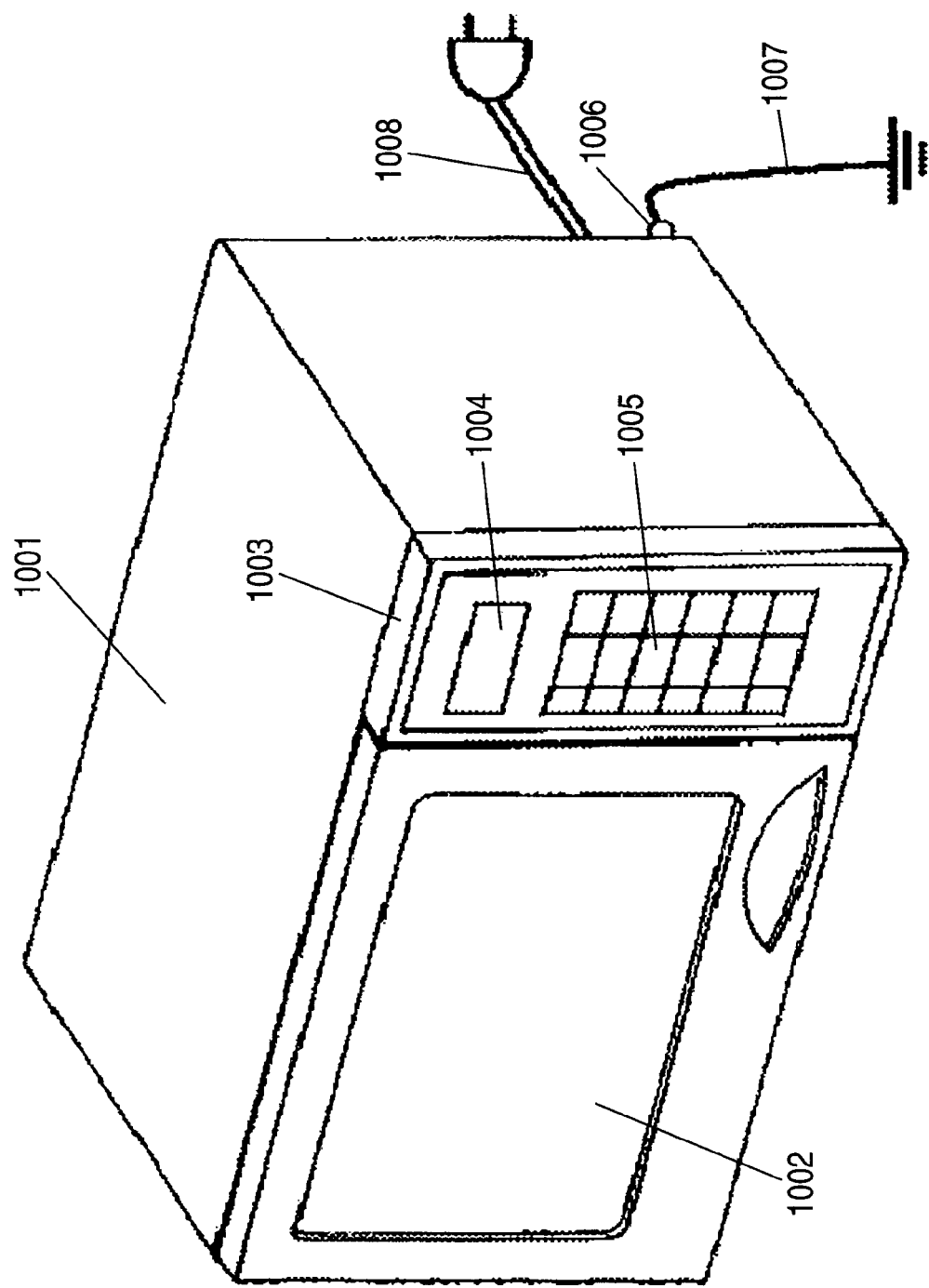
FIG. 3 is an outer view of a heating cooking device according to the second embodiment of the present invention.

FIG. 3 indicates an outer view of a heating cooking device according to the second embodiment of the present invention. As shown in FIG. 3, a door 1002 is provided on a front plane of a main body 1001 in such a manner that the door 1002 can be freely opened/closed. Reference numeral 1003 indicates an operation panel. A display element 1004 and a keyboard 1005 are provided on the operation panel 1003. An earth line 1007 is connected to an earth terminal 1006 provided on the main body 1001 so as to earth the main body 1001. Reference numeral 1008 indicates a power supply wire.

Figure 4:
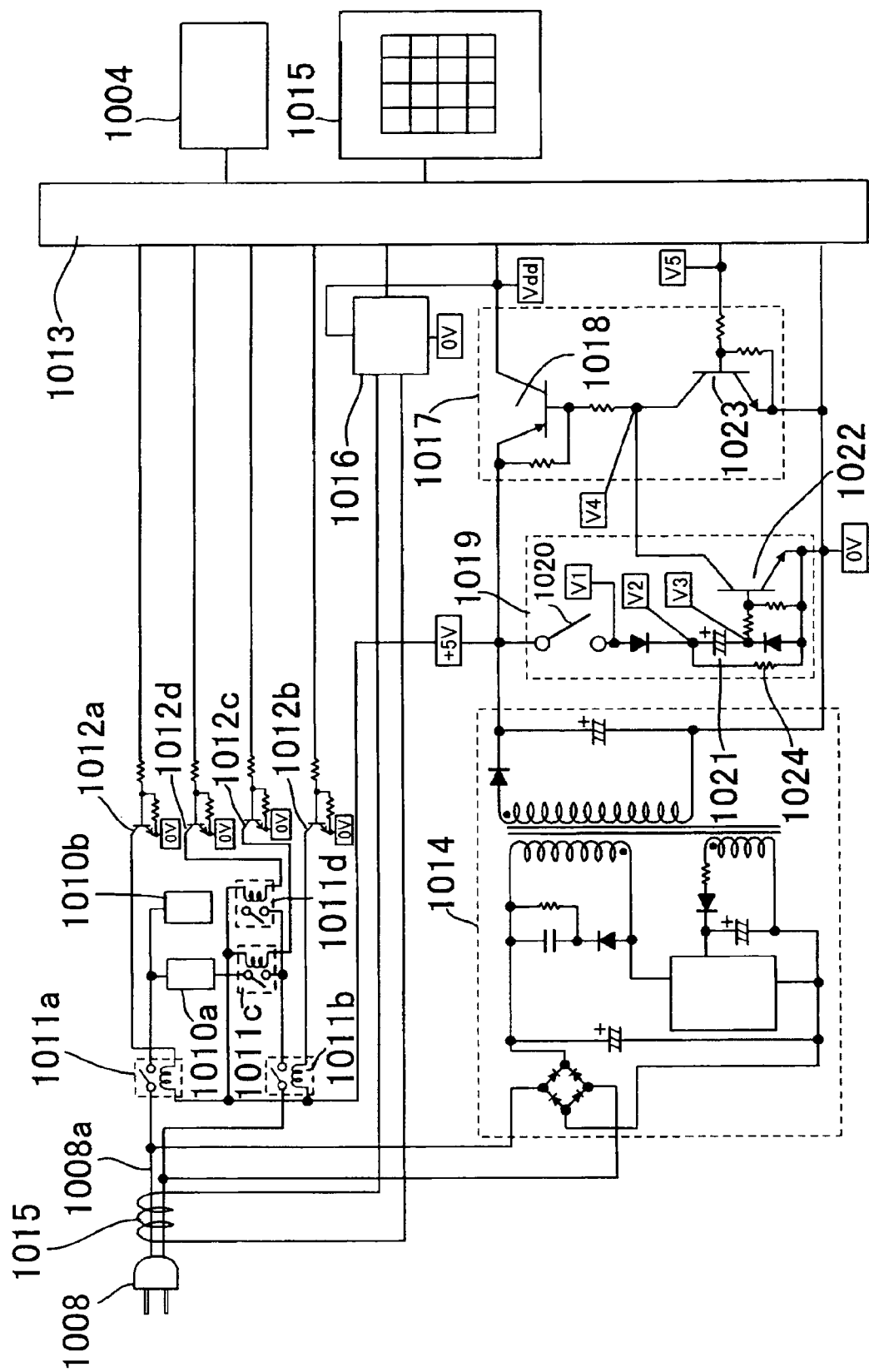
FIG. 4 is a circuit diagram of the heating cooking device according to the second embodiment of the present invention.

FIG. 4 represents a circuit diagram of the heating cooking device according to the third embodiment of the present invention. As shown in FIG. 4, reference numerals 1010*a* and 1010*b* show a high frequency generator and a heater (corresponding to heating source) respectively, namely loads of the present invention. The high frequency generator 1010*a* is arranged by a magnetron and the like, which generators microwaves in order to heat food corresponding to a material to be heated. The power supply voltages for these loads are applied from the power supply wire 1008 through an electric wire 1008*a* of the commercial power supply via relays 1011*a*, 1011*b*, 1011*c*, and 1011*d*, functioning as switches which are controlled by the control means of the present invention. Also, as to all of these loads, both terminals thereof are cut off by the relays 1011*a* and 1011*b* with respect to the power supply. The relays 1011*a*, 1011*b*, 1011*c*, and 1011*d* are designed to be actuated by turning ON transistors 1012*a*, 1012*b*, 1012*c*, and 1012*d* so that currents may flow through coils of these relays 1011*a*, 1011*b*, 1011*c*, and 1011*d*. These transistors 1012*a*, 1012*b*, 1012*c*, and 1012*d* operate in response to control signals supplied from a microcomputer 1013 which constitutes the control means.

Reference numeral 1014 shows an AC/DC converter which constitutes a power supply unit for producing a DC voltage (+5 V) required to operate the control means. The AC/DC converter 1014 is directly connected to the electric wire 1008*a* of the commercial power supply supplied from the power supply wire 1008. This sort of power supply has a function capable of suppressing power consumption lower than, or equal to 10 mW when no load is connected. The above-described AC/DC converter 1014 can reduce the unnecessary power consumption during the standby mode, so that while the power saving characteristic of the AC/DC converter 1014 itself during the standby mode may be effectively utilized, the standby power of the heating cooking device can be reduced. A zero phase current transformer 1015 corresponding to a current detecting unit of the embodiment 2 of the present invention is provided on the electric wire 1008*a* connected to the power supply wire 1008, so that the zero phase current transformer 1015 detects a generation of an unbalance current in the electric wire 1008*a*. The unbalance current is produced by the following reason: That is, such a current supplied from the electric wire subsequent to the zero phase current transformer 1015 is leaked from the outer housing of the main body 1001 and the earth connected to the outer housing due to insulation deteriorations, or ground faults as to the electric wire and the loads and the control means connected to the electric wire.

Reference numeral 1016 shows an earth leakage judging unit for converting an output of the zero phase current transformer 1015 into such a signal level which can be judged by the microcomputer 1013. For instance, when an unbalance current exceeds 10 mA, the earth leakage judging unit 1016 outputs an output voltage having a "Vdd" level corresponding to the power supply voltage of the microcomputer 1013. When an unbalance current is lower than, or equal to 10 mA, the earth leakage judging unit 1016 outputs such an output voltage equal to 0 V, namely, the reference potential of the microcomputer 1013. Based upon the output signal of this earth leakage judging unit 1016, the microcomputer 1013 judges whether or not earth leakage occurs. Also, the value of this unbalance current is set to such a value which gives no adverse influence to a human body by considering conditions such as operating times after the earth leakage is detected until the contact points of the relays 1011*a* and 1011*b* are opened.

Reference numeral 1017 indicates a power source electric power supplying unit of the present invention. Since a transistor 1018 is turned ON/OFF which constitutes the power source electric power supplying unit 1017, the supply of the electric power to the control means and others can be controlled. In the second embodiment of the present invention, the microcomputer 1013, the earth leakage judging unit 1016, the display element 1004, and the keyboard 1005, which constitute the control means, operates receiving the electric power supplied from the power source electric power supplying unit 1017.

Reference numeral 1019 indicates an initiation signal generating unit. A door switch 1020 is provided with the initiation signal generating unit 1019, and is turned ON/OFF in cooperation with the open/close operations of the door 1002 provided on the front plane of the main body 1001. The initiation signal generating unit 1019 is designed to generate an initiation signal in response to the ON/OFF operations of the door switch 1020. The power source electric power supplying unit 1017 is turned ON, or the ON state thereof is maintained in response to either the initiation signal output by the initiation signal generating unit 1019 or a power supply holding signal output from the microcomputer 1013. Under such a condition that the transistor 1018 of the power source electric power supplying unit 1017 is turned OFF, the supply of the electric power to the control means and others is being stopped, and the microcomputer 1013 which controls the entire system of the heating cooking device is in a suspension state. Moreover, the relays 1011*a*, 1011*b*, 1011*c*, 1011*d*, coupled to the output terminal of the AC/DC converter 1014, do not consume the electric power because transistors 1012*a*, 1012*b*, 1012*c*, 1012*d* are turned OFF, which are respectively coupled to the coils of the relays 1011*a*-1011*b*, 1011*c*, and 1011*d*. Also, the initiation signal generating unit 1019 does not consume the electric power because the door switch 1020 is turned OFF when the door 1002 is closed. As explained above, the output current of the AC/DC converter 1014 becomes minimum, and the power consumption of the heating cooking device also becomes minimum.

Figure 5A:
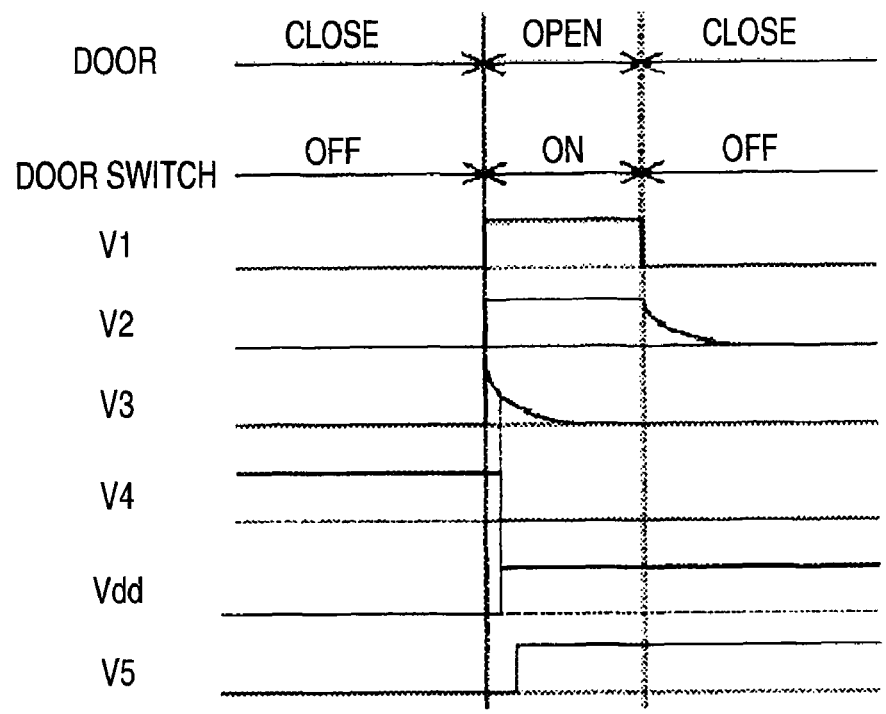
FIG. 5(a) is a timing chart for representing voltages of respective portions of an initiation signal generating unit when a door is opened or closed in the standby mode in the second embodiment of the present invention.
Figure 5B:
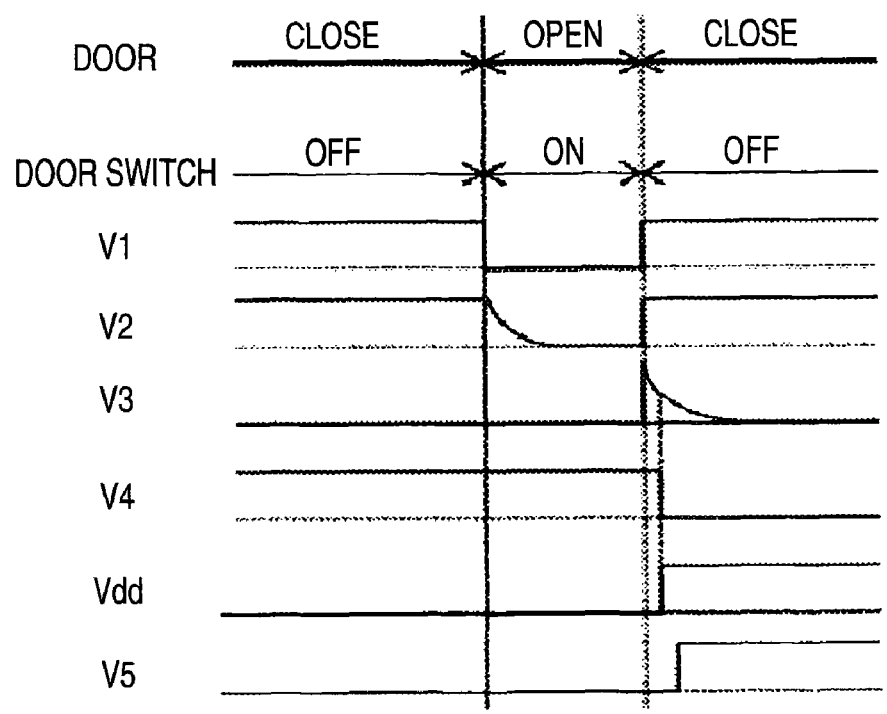
FIG. 5(b) is a timing chart for indicating voltages of the respective portions of the initiation signal generating unit when ON/OFF logic states of a door switch are reversed.

A description will be made of operations and effects with respect to the heating cooking device which is provided in the above-described manner as follows:

Firstly, operations of the initiation signal generating unit 1019 will be explained. FIG. 5 is a timing chart for representing voltages of the respective units of the initiation signal generating unit 1019 when the door 1002 is opened and closed: FIG. 5(*a*) shows a timing chart when the door 1002 is closed, and the door switch 1020 is turned OFF; and FIG. 5(*b*) shows a timing chart when the door 1002 is closed, and the door switch 1020 is turned ON. FIG. 5(*a*) shows a time duration from such a condition that the door 1002 is closed in the standby mode, and the door 1002 is opened, the microcomputer 1013 operates, and then, the operation condition is continued. A relationship between the door 1002 and the door switch 1020 is given as follows: When the door 1002 is closed, the door switch 1020 is turned OFF, whereas when the door 1002 is opened, the door switch 1020 is turned ON. When the user opens the door 1002 in the standby mode, the door switch 1020 is turned ON, so that a voltage of +5 V is generated at V1 and V2. When the voltage is generated at V2, a charging current flows through a capacitor 1021, and then, a voltage of V3 shown in FIG. 5(*a*) is generated at V3 until the charging current becomes 0. The transistor 1022 is turned ON by the voltage generated at V3, and V4 becomes 0V level, and thus, a base current of the transistor 1018 flows, so as to turn ON the transistor 1018. Due to the initiation signal generating unit 1019, the power source electric power supplying unit 1017 is turned ON, so that the microcomputer 1013 starts to operate. Then, the microcomputer 1013 outputs a power supply holding signal (V5), so as to turn ON the transistor 1023 of the power source electric power supplying unit 1017, continue to supply the voltage of +5 V to Vdd, and thus, continue the operation.

ON/OFF logic operations of the door switch 1020 shown in FIG. 5(*b*) are opposite to those of FIG. 5(*a*). That is, a relationship between the door 1002 and the door switch 1020 is given as follows: When the door 1002 is closed, the door switch 1020 is turned ON, whereas when the door 1002 is opened, the door switch 1020 is turned OFF. When the user opens the door 1002 in the standby mode, the door switch 1020 is turned OFF, so as to change a voltage of +5 V to 0 V. The voltage at V2 is gradually changed from +5 V to 0 V in correspondence with such a condition that electron charges stored in the capacitor 1021 are discharged via the resistor 1021, and then keeps 0 V until the door 1002 is again closed.

Next, when the door 1002 is closed so that the door switch 1020 is turned ON, the voltage of V2 becomes +5 V. If the voltage is generated at V2, then a charging current flows through the capacitor 1021 and a voltage of FIG. 5(*b*) is generated until the charging current becomes 0. In response to the voltage generated at V3, the transistor 1022 is turned ON, the voltage of V4 becomes 0 V level, and thus, a base current of the transistor 1017 flows, so as to turn ON the transistor 1018. Due to the operations of the initiation signal generating unit 1019, the power source electric power supplying unit 1017 is turned ON, so that the microcomputer 1013 starts to operate. Then, the microcomputer 1013 outputs a power supply holding signal (V5), so as to turn ON the transistor 1023 of the power source electric power supplying unit 1017, continue to supply the voltage of +5 V to Vdd, and thus, continue the operation.

Next, if the power supply electric power supplying unit 1017 starts to apply a voltage of +5 V to Vdd, then the earth leakage judging unit 1016 operates. The zero phase current transformer 1015 can detect an unbalance current produced in the electric wire 1008*a*, and produces such an output voltage which is directly proportional to this unbalance current. While the earth leakage judging unit 1016 monitors output voltages generated from the zero phase current transformer 1015, if the monitored output voltage becomes higher than, or equal to the sensing voltage, then the earth leakage judging unit 1016 judges that the earth leakage occurs, and outputs the judgement result with respect to the microcomputer 1013. Under such a normal condition that the earth leakage does not occur, the microcomputer 1013 turns ON and OFF the relays 1011*a*, 1011*b*, 1011*c*, 1011*d* in accordance with a previously programmed sequence so as to control the high frequency generator and the heating source, so as to heat a material to be cooked. Then, in the case that after the cooking is accomplished, the condition is not transferred for a predetermined time (for example, in such a case that keyboard 1005 is not manipulated), since the microcomputer 1013 drops the level of the power supply holding signal to zero V level so as to stop the power supply electric power applying unit 1017, the microcomputer 1013 stops supplying the electric power to both the control means and the earth leakage judging unit 1016, and transfers into the standby mode.

Next, a description is made of operations in such a case that an occurrence of earth leakage is detected. When the relays 1011*a*, 1011*b*, 1011*c*, 1011*d* are turned ON and OFF to apply voltages to the high frequency generator and the load corresponding to the heating source, the microcomputer 1013 immediately turns OFF the relays to stop the supply of the voltages. Furthermore, the microcomputer 1013 causes the display element 1004 to notify the occurrence of this earth leakage to the user in order to prompt to cease using the cooking device. Also, while the display element 1004 is notifying the occurrence of the earth leakage, the microcomputer 1013 does not transfer into the standby mode, but continuously issues the notification.

(Embodiment 3)

Figure 6:
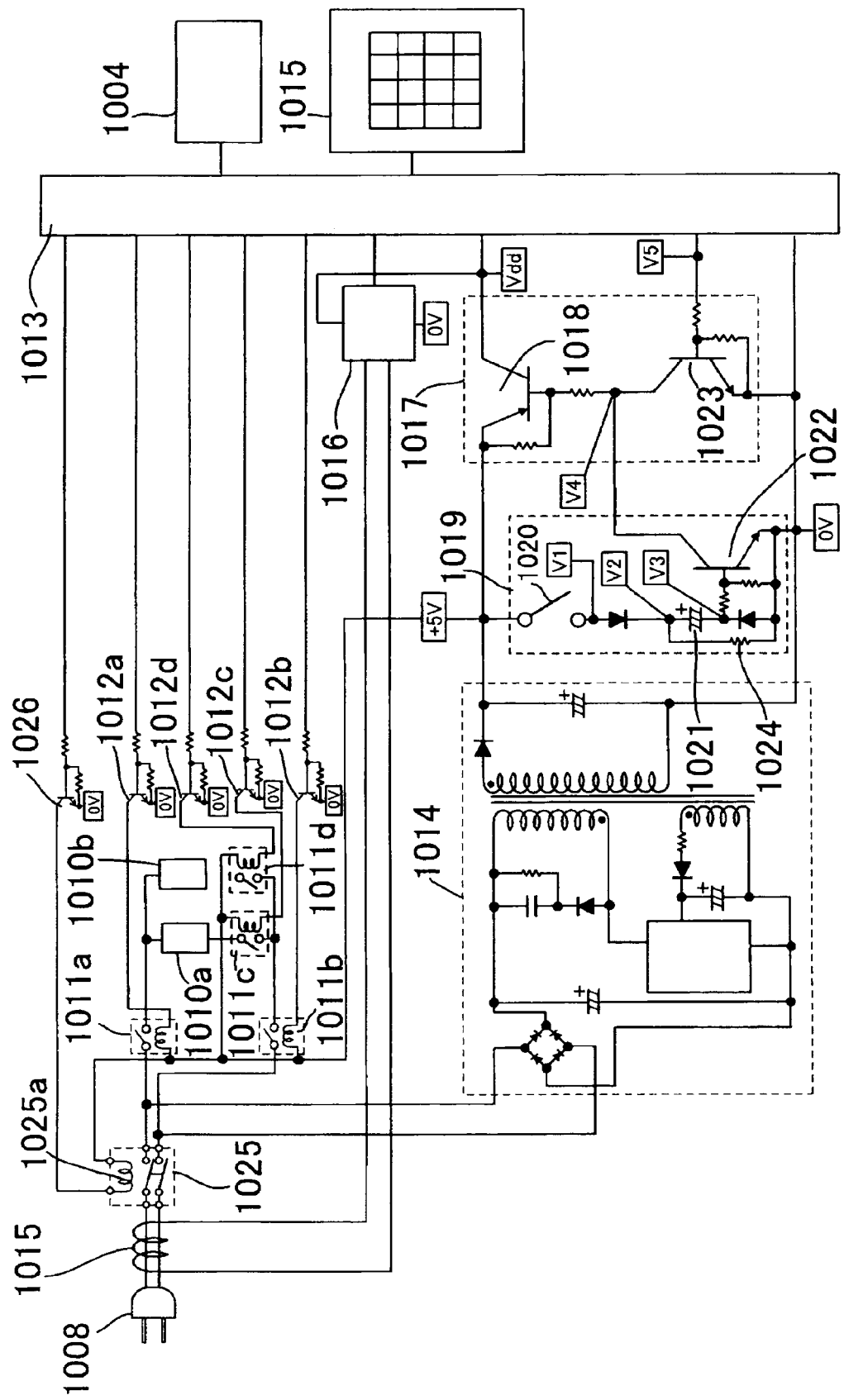
FIG. 6 is a circuit diagram of a heating cooking device according to the third embodiment of the present invention.

FIG. 6 is a circuit diagram of a microwave oven according to a third embodiment of the present invention. It should be understood that the same reference numerals shown in the embodiment 2 will be employed as those for denoting the same structural elements of the embodiment 3, and descriptions thereof will be omitted. As a different point from that of the second embodiment, a power switch 1025 having a reset function is provided in front of an electric wire connected to a load and a power supply unit. The power switch 1025 is arranged in such a manner that when the power switch 1025 is switched to a close state in a manual manner, the close state is maintained by a magnet. Although the power switch 1025 may also be switched to an open state in the manual manner, this power switch 1025 may be returned to the open state if a coil 1025*a* is energized, then repelling force is produced in a direction along the contact points thereof are opened.

A description is made of operations and effects as to the microwave oven provided in the above-described manner.

Firstly, since the power switch 1025 is brought into the close state, electric power is supplied to the AC/DC converter 1014, to output a voltage of +5 V therefrom. Under this condition, a heating cooking device is still in the standby mode, and power consumption by the AC/DC converter 1014 under such a status that an output current of the AC/DC converter 1014 is a minimum current becomes equal to such an electric power which the heating cooking device consumes. In recent year, there are some AC/DC converters in which standby power in the case of no output currents is lower than, or equal to 10 mW; and since outputs of the AC/DC converters are reduced as low as possible, power consumption of cooking devices in the standby mode can be reduced lower than, or equal to 50 mW.

Next, since the door 1002 is opened and closed, the voltage of +5 V is applied to the microcomputer 1013, so that the microcomputer 1013 proceeds to an operating mode. Under such a normal condition that the earth leakage does not occur, the microcomputer 1013 turns ON and OFF the relays 1011*a*, 1011*b*, 1011*c*, 1011*d* in accordance with a sequence programmed in advance to control the high frequency generator 1010*a* and a heater 1010*b*, and thus heat a material to be cooked. Then, in the case that after the cooking is accomplished, the condition is not transferred for a predetermined time, since the microcomputer 1013 drops the level of the power supply holding signal to zero V level to stop the power supply electric power applying unit 1017, the microcomputer 1013 stops supplying the electric power to both the control means and the earth leakage judging unit 1016, and transfers into the standby mode.

Next, a description is made of operations in such a case that an occurrence of earth leakage is detected. When the relays 1011*a*, 1011*b*, 1011*c*, 1011*d* are turned ON or OFF respectively to apply voltages to the high frequency generator 1010*a* and the load corresponding to the heating source 1010*b*, the microcomputer 1013 immediately turns OFF the relays and stops the supply of the voltages. Since the relays are turned OFF, if the output of the earth leakage judging unit 1016 is returned to the normal condition, then the microcomputer 1013 causes the display element 1004 to notify the occurrence of this earth leakage to the user in order to prompt to cease using the cooking device. Also, while the display element 1004 is notifying the occurrence of the earth leakage, the microcomputer 1013 does not transfer into the standby mode, but continuously issues the notification. In the case that both terminals of the load are cut off, when the earth leakage judging unit 1016 further judges an occurrence of earth leakage, the microcomputer 1013 immediately outputs a signal for turning ON the transistor 1026, and energizes the coil 1025*a* in order to open the contact points of the power switch 1025.

(Embodiment 4)

Figure 7:
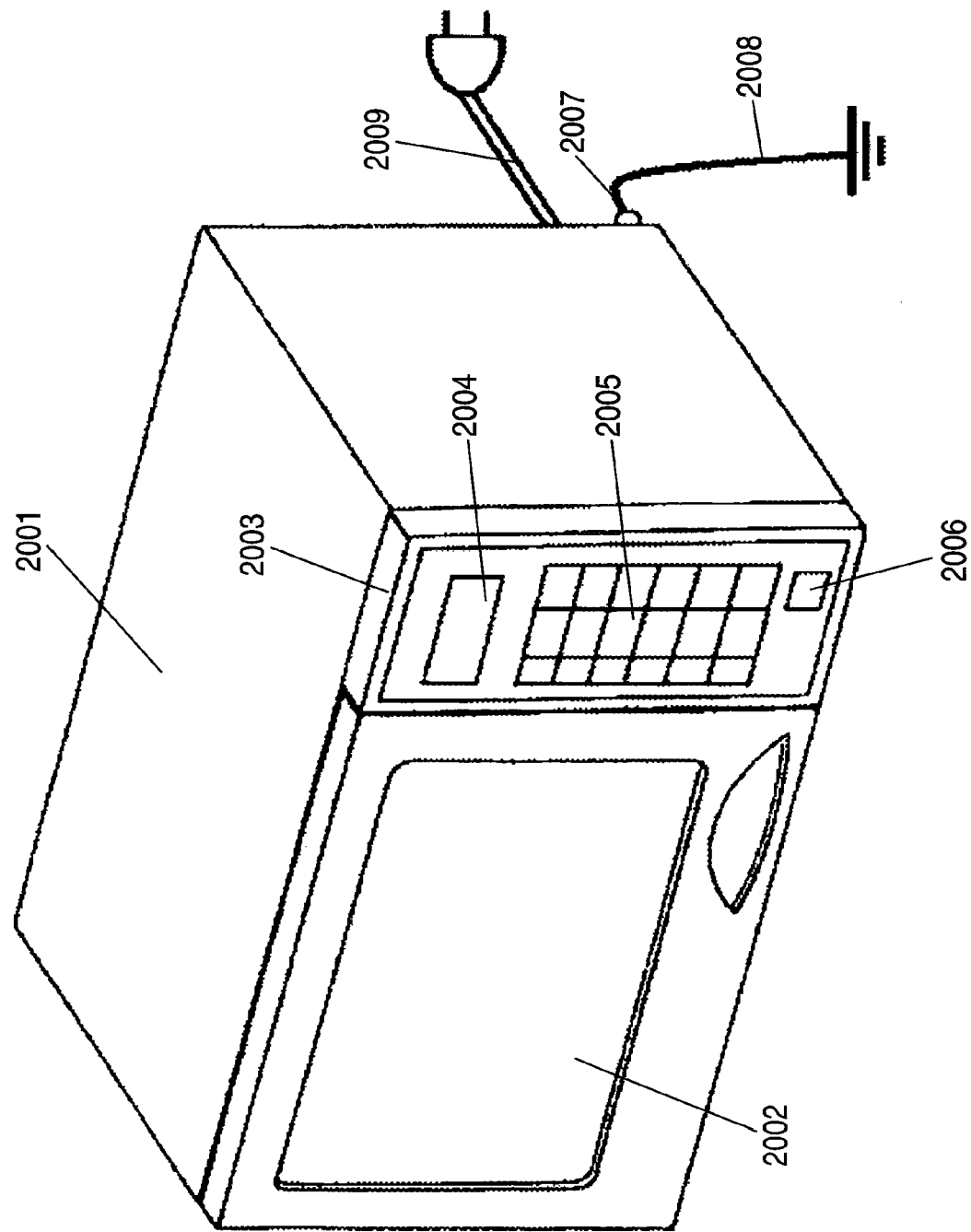
FIG. 7 is an outer view of a microwave oven according to the fourth embodiment of the present invention.

FIG. 7 shows an outer view of a microwave oven according to a fourth embodiment of the present invention. As shown in FIG. 7, a door 2002 is provided on a front plane of a main body 2001 in such a manner that the door 2002 can be freely opened/closed. Reference numeral 2003 indicates an operation panel. A display unit 2004, a keyboard 2005, and a power ON key 2006 is provided on the operation panel 2003. An earth line 2008 is connected to an earth terminal 2007 provided on the main body 2001 so as to earth the main body 2001. Reference numeral 2009 indicates a power supply wire.

Figure 8:
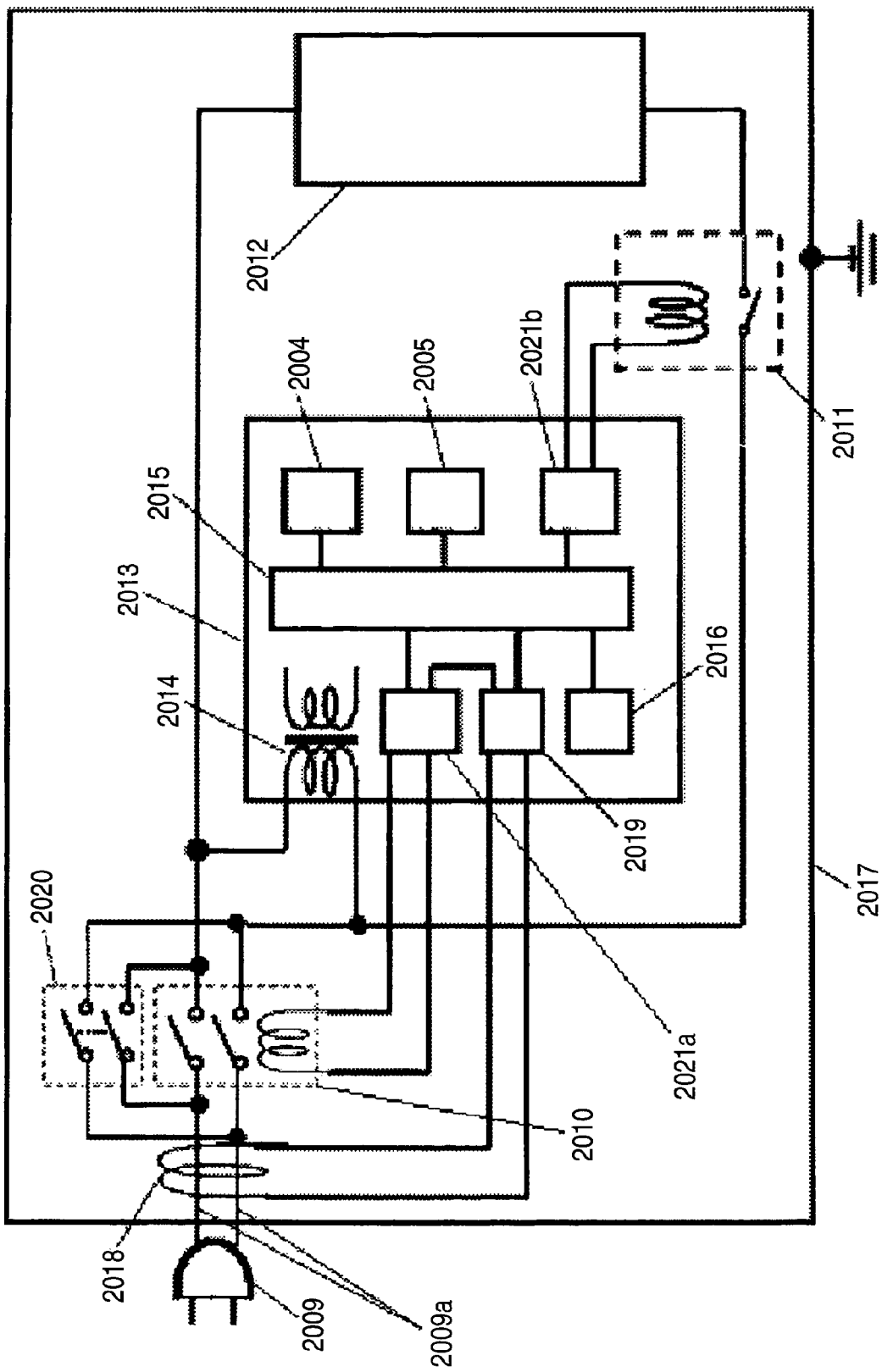
FIG. 8 is a circuit diagram of the microwave oven according to the fourth embodiment of the present invention.

FIG. 8 represents a circuit diagram of the microwave oven according to the fourth embodiment of the present invention.

As shown in FIG. 8, a power supply is connected to contact points of a relay 2010 and a high frequency generator 2012 from the power supply wire 2009 via a contact point of another relay 2011. The relay 2010 corresponds to a main switching device of the present invention. The high frequency generator 2012 is arranged by a magnetron and the like, while the magnetron generates microwaves so as to heat food corresponding to a material to be heated. As a load of the present invention, the high frequency generator 2012 is represented in the fourth embodiment of the present invention. Reference numeral 2013 indicates control means, and electric power is being supplied to the control means 2013 by a low voltage transformer 2014. In the control means 2013, a microcomputer 2015, the keyboard 2005, the display unit 2004 functioning as notifying means, and storage means 2016 are provided. The microcomputer 2015 controls a process operation of a signal from the keyboard 2005 which is externally entered, a display process operation of the display unit 2004, and operations of the relays 2010 and 2011. Reference numeral 2017 shows an outer housing which is earthed via the earth line 2008 of the main body 2001. A zero phase current transformer 2018 corresponding to a current detector is provided in the electric wire 2009*a* derived from the power supply wire 2009, so that the zero phase current transformer 2018 detects a generation of an unbalance current in the electric wire 2009*a*. The unbalance current is produced by the following reason: That is, such a current supplied from the electric wire 2009*a* subsequent to the zero phase current transformer 2018 is leaked from the outer housing 2017 of the main body 2001 and the earth connected to the outer housing 2017 due to insulation deteriorations, or ground faults as to the electric wire 2009*a*, and as to both the high frequency generator 2012 (namely, load) and the control means 2013, which are connected to the electric wire 2009*a*. Reference numeral 2019 shows an earth leakage judging means for converting an output of the zero phase current transformer 2018 into such a signal level which can be judged by the microcomputer 2015. For instance, in such a case that an unbalance current exceeds 10 mA, the earth leakage judging means 2019 outputs an output voltage having a "Vdd" level corresponding to the power supply voltage of the microcomputer 2015. When an unbalance current is lower than, or equal to 10 mA, the earth leakage judging means 2019 outputs such an output voltage having a "Vss" level of the reference potential of the microcomputer 2015. Based upon the output signal of this earth leakage judging means 2019, the microcomputer 2015 judges whether or not earth leakage occurs. Also, the value of this unbalance current is set to such a value which gives no adverse influence to a human body by considering conditions such as operating times after the earth leakage is detected until the contact points of the relay 2010 are opened. Reference numeral 2020 indicates a switch that is connected parallel to the contact points of the relay 2010. The switch 2020 is designed to be closed by depressing the power ON key 2006 provided on the main body 2001.

A description is made of operations and effects as to the microwave oven with employment of the above-described arrangement.

Firstly, under such a condition that the contact points of the relay 2010 are opened, no electric power is supplied to both the control means 2013 and the high frequency generator 2012, so as to bring the microwave oven into the standby mode. When the user uses the microwave oven, first of all, the user depresses the power ON key 2006. As a result, the switch 2020 is closed and the electric power is supplied from the low voltage transformer 2014 to the control means 2013, and the control means 2013 starts to operate. In such a case that the earth leakage does not occur in response to the output signal from the earth leakage judging means 2019, the microcomputer 2015 provided in the control: means 2013 closes the contact points of the relay 2010. Since the contact points of the relay 2010 are closed, the electric power is subsequently supplied to the control means 2013, and the operation thereof is continued.

Next, when the user enters both a cooking mode and a heating time by manipulating the keyboard 2005, and also, enters a start command by the keyboard 2005, a relay driving unit 2021*b* closes the contact point of the relay 2011 in response to the output from the microcomputer 2015. As a consequence, the electric power is supplied to the high frequency generator 2012 to generate microwaves so as to heat the food. When the cooking is ended, the microcomputer 2015 opens the contact point of the relay 2011. In such a case that all of the cooking are accomplished and then the microwave oven transfers into the standby mode, the user enters a power OFF command by manipulating the keyboard 2005 so as to open the contact points of the relay 2010. As a result, the microwave oven transfers into the standby mode.

Alternatively, in order to avoid such a cumbersome inputting operation of the power OFF command, or in case that the user forgets to enter the power OFF command after using the microwave oven, for instance, while such a waiting time is provided which does not cause the user to have an inconvenient feeling as to the input operation of the keyboard 2005, the microwave oven may be provided with an automatic power OFF function, namely, when the user does nothing during this waiting time, the microcomputer 2015 may open the contact points of the relay 2010 to bring the microwave oven into the standby mode.

Also, in the case that the earth leakage judging means 2019 judges an occurrence of earth leakage while the contact points of the relay 2010 are closed, the microcomputer 2015 immediately turns OFF the contact points of the relay 2010 to improve security.

Furthermore, in the fourth embodiment, in case of a malfunction of the microcomputer 2015, the microwave oven is provided in such a manner that a relay driving unit 2021a receives an output signal of the earth leakage judging means 2019. When the output signal of the earth leakage judging means 2019 constitutes a signal having a "Vdd" level, the relay driving unit 2021a can open the contact points of the relay 2010 in response to the output signal of the earth leakage judging means 2019 irrespective of the output signal derived from the microcomputer 2015.

Also, when the earth leakage judging means 2019 judges that the earth leakage occurs, the microcomputer 2015 displays an error indication on the display unit 2004, and further, when the contact points of the relay 2010 are closed, the microcomputer 2015 opens the contact points of the relay 2010 to cut off the electric wire 2009a, the supply of the electric power to the earth leakage occurrence portion is stopped. Even when the contact points of the relay 2010 are opened, the control means 2013 can continuously display the error indication on the display unit 2004 for a time being due to a back-up structure such as a smoothing capacitor provided on the secondary side of the low voltage transformer 2014 which supplies the electric power to the control means 2013. As a result, the microcomputer 2015 can notify the occurrence of the earth leakage to the user. A time duration during which this error indication is continuously displayed may be easily prolonged by increasing the capacitance of the above-explained smoothing capacitor. Also, in order to further prolong the time duration for displaying the error, an additional earth leakage display unit and a back-up power supply only for the earth leakage display unit may be alternatively provided. When the driving voltage of the control means 2013 becomes lower than a power supply voltage capable of driving the control means 2013, the control means 2013 stops to transfer into the standby mode.

Also, when the earth leakage judging means 2019 judges an occurrence of earth leakage, the microcomputer 2015 displays an error indication on the display unit 2004, and further, stores error information in a storage means 2016 provided in the control means 2013; and also, when the contact points of the relays 2010 are closed, the microcomputer 2015 opens the contact points of the relay 2010 and cut off the electric wire 2009a so as to stop the supply of the electric power to the earth leakage occurring place.

Moreover, the microcomputer 2015 displays the error indication and stores the error information in the storage means 2016 as follows: That is, when the contact points of the relay 2010 are closed, the microcomputer 2015 first of all opens the contact points of the relay 2010, and then displays and stores the information as described above while the control means 2013 continuously operates due to the back-up structure such as the smoothing capacitor provided on the secondary side of the low voltage transformer 2014 which supplies the electric power to the control means 2013. As a result, the microcomputer 2015 can more quickly cut off the electric wire 2009a and stop supplying the electric power to the earth leakage occurring place.

Also, since cooking devices such as microwave ovens may produce a large amount of steam depending upon food during cooking, which causes temporary dewdrops, and earth leakage is likely to occur in a certain place. When earth leakage happens to occur, the microcomputer 2015 opens the contact points of the relay 2010 based upon the output signal of the earth leakage judging means 2019, so that the control means 2013 stops the operation to transfer into the standby mode. The dewdrops are likely to cause a temporary earth leakage which may disappear in a little while. A user who is not located near a microwave oven is likely to overlook the occurrence of this earth leakage. In such a case, when the user again manipulates the power ON key 2006 to operate the microwave oven, the earth leakage judging means 2019 does not detect the occurrence of the earth leakage, but can operate in a normal condition. In some cases, the above-explained phenomenon may be handled as a non-reproducible failure claim. To accept such a non-reproducible failure claim, a content of an error is previously stored in the storage means 2016 provided in the control means 2013. Either the user or a service man enters an error calling command with the keyboard 2005, so that the content of the error may be called.

As previously described, in the fourth embodiment, when the microwave oven is in the standby mode, the main switching device such as the relay cuts off the electric wire to the load and the control means, which reduces the risk of either the earth leakage or the electric shock. Also, without the unnecessary power consumption, the standby power can be decreased.

In the fourth embodiment, the power ON key 2006 is employed; and when the power ON key 2006 is depressed and the switch 2020 is closed so as to supply the electric power to the control means 2013, the microwave oven starts to operate. Alternatively, it is so designed that when the door 2002 is opened, the switch 2020 may be closed. As a result, the power ON key 2006 is no longer required, and thus, a cumbersome operation for the users to depress the power ON key 2006 whenever cooking may be omitted.

(Embodiment 5)

Figure 9:
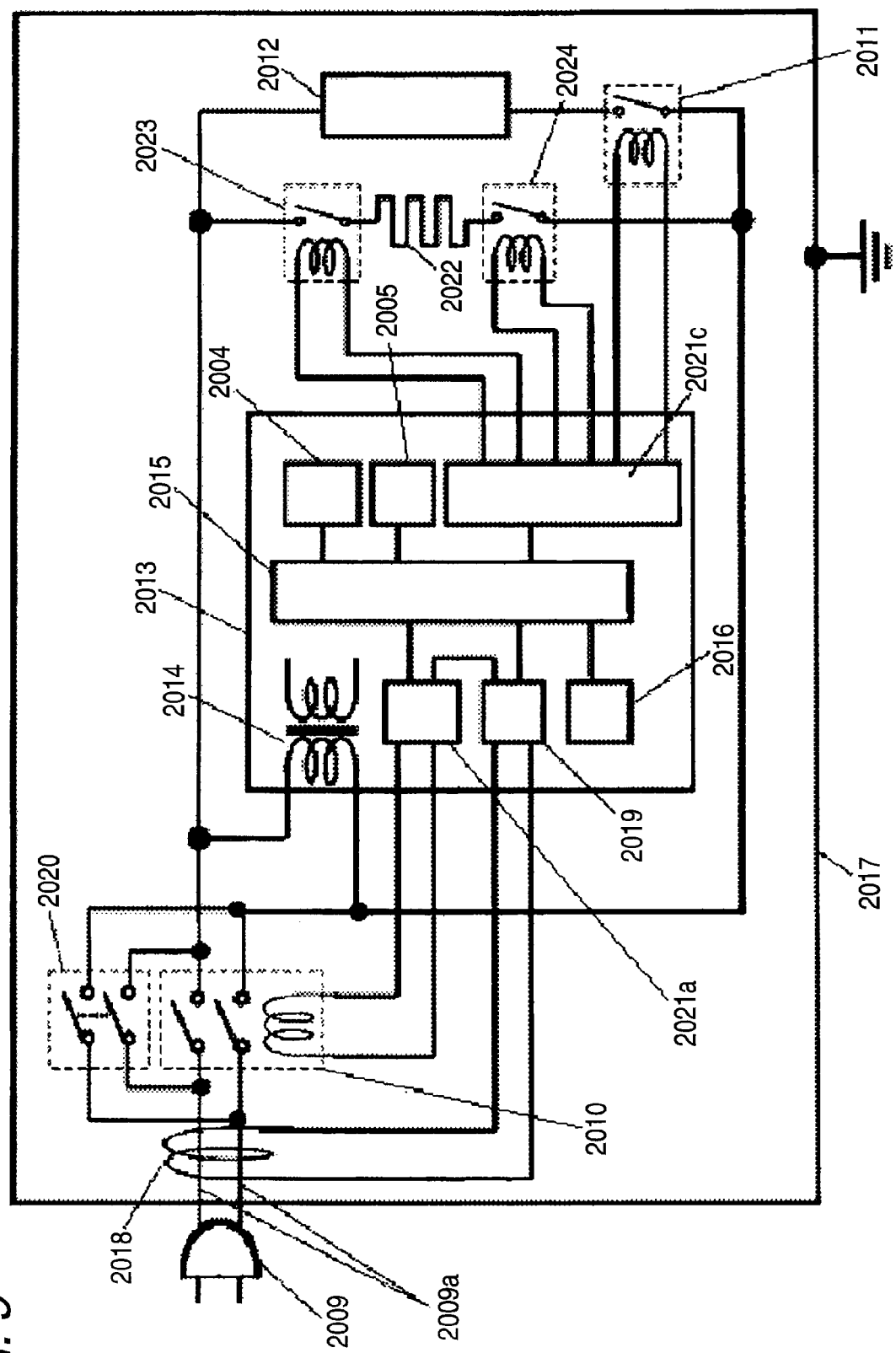
FIG. 9 is a circuit diagram of a microwave oven according to the fifth embodiment of the present invention.

FIG. 9 is a circuit diagram of a microwave oven according to a fifth embodiment of the present invention. It should be understood that the same reference numerals shown in the embodiment 4 will be employed as those for denoting the same structural elements of the embodiment 5, and descriptions thereof will be omitted. As a different point from that of the fourth embodiment, when a plurality of loads of the present invention are provided, a heater 2022 is employed other than a high frequency generator 2012 in the fifth embodiment. As a result, an electric oven function and a grill function are additionally provided. Both the high frequency generator 2012 and the heater 2022 can operate, or can be energized by opening/closing a relay 2011, a relay 2023, and a relay 2024. A relay driving unit 2021c drives these relays 2011, 2023, and 2024 upon receipt of a control signal of the microcomputer 2015.

Next, when food is high-frequency-heated with microwaves, the relay 2011 is closed in order to supply electric power to the high frequency generator 2012, so that microwaves are generated therefrom and are irradiated to the food. When the heater 2022 heats food, both the relays 2023 and 2024 are closed in order to supply electric power to the heater 2022, so that the heater 2022 generates heat so as to heat the food.

In such an arrangement, for instance, when insulation of the heater 2022 and insulation of an outer housing 2017 are deteriorated, the heater 2022 is not energized unless both the relays 2023 and 2024 are closed. As a result, earth leakage cannot be detected. Under such a circumstance, while an examination-purpose program is previously stored in the microcomputer 2015, since the user enters an instruction for executing the examination-purpose program with the keyboard 2005, all of the loads can be automatically switched so as to operate. As a result, the microcomputer 2015 can examine whether or not earth leakage occurs in the heater 2022 and the high frequency generator 2012. In the fifth embodiment, the description has been made in such a case that the heater 2022 and the high frequency generator 2012 are employed as the two loads. When more than two loads are used in an electric appliance, the above-described earth leakage examination may become more effective. Also, when earth leakage is detected during the examination, since the display unit 2004 displays such an error indication for notifying the loads under operation and the occurrence of the earth leakage, this error indication may cause such an effective information capable of specifying an occurring place of the earth leakage.
(Embodiment 6)

Figure 10:
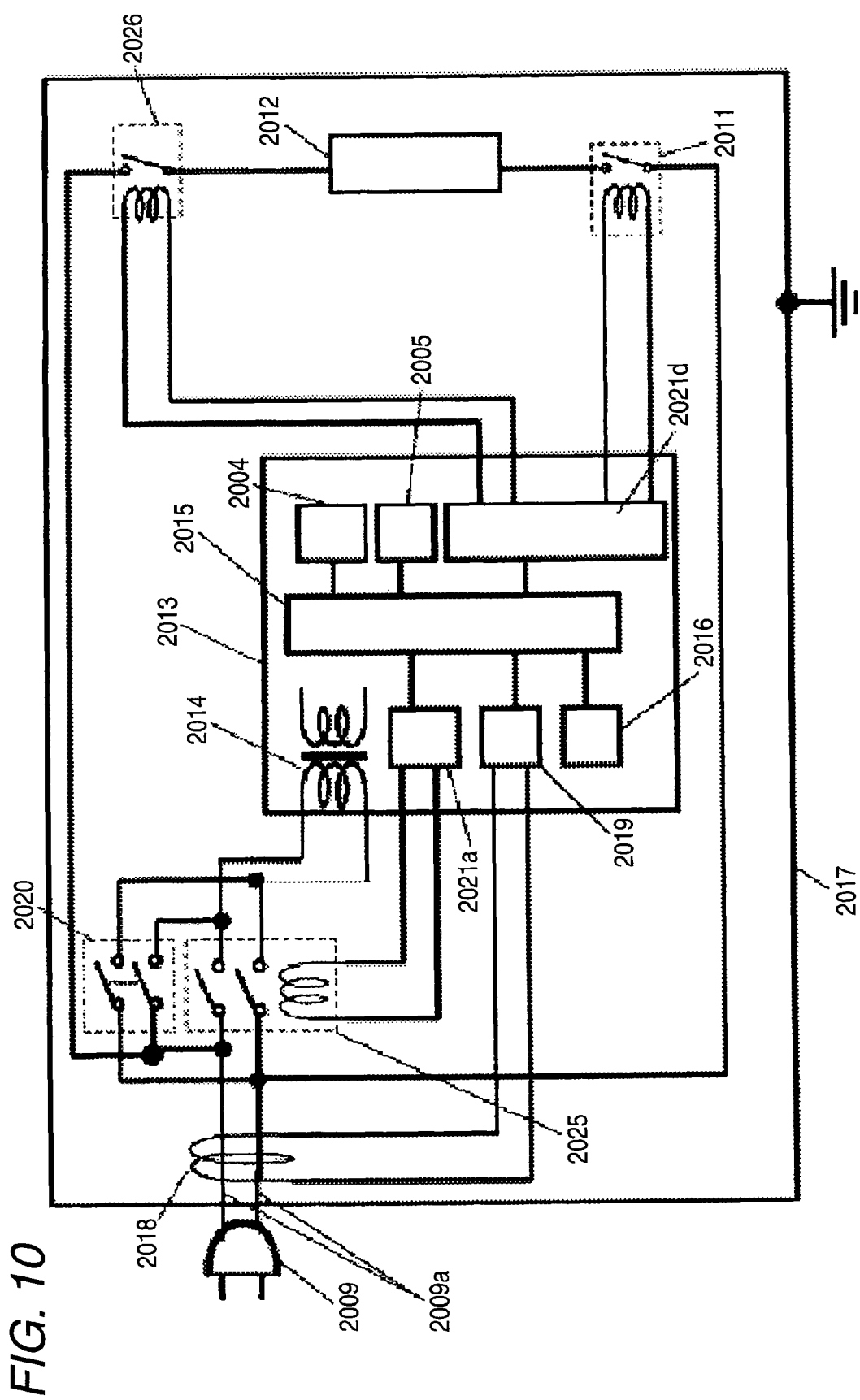
FIG. 10 is a circuit diagram of a microwave oven in which a main switching device is provided on an electric wire to control means, according to the sixth embodiment of the present invention.
Figure 11:
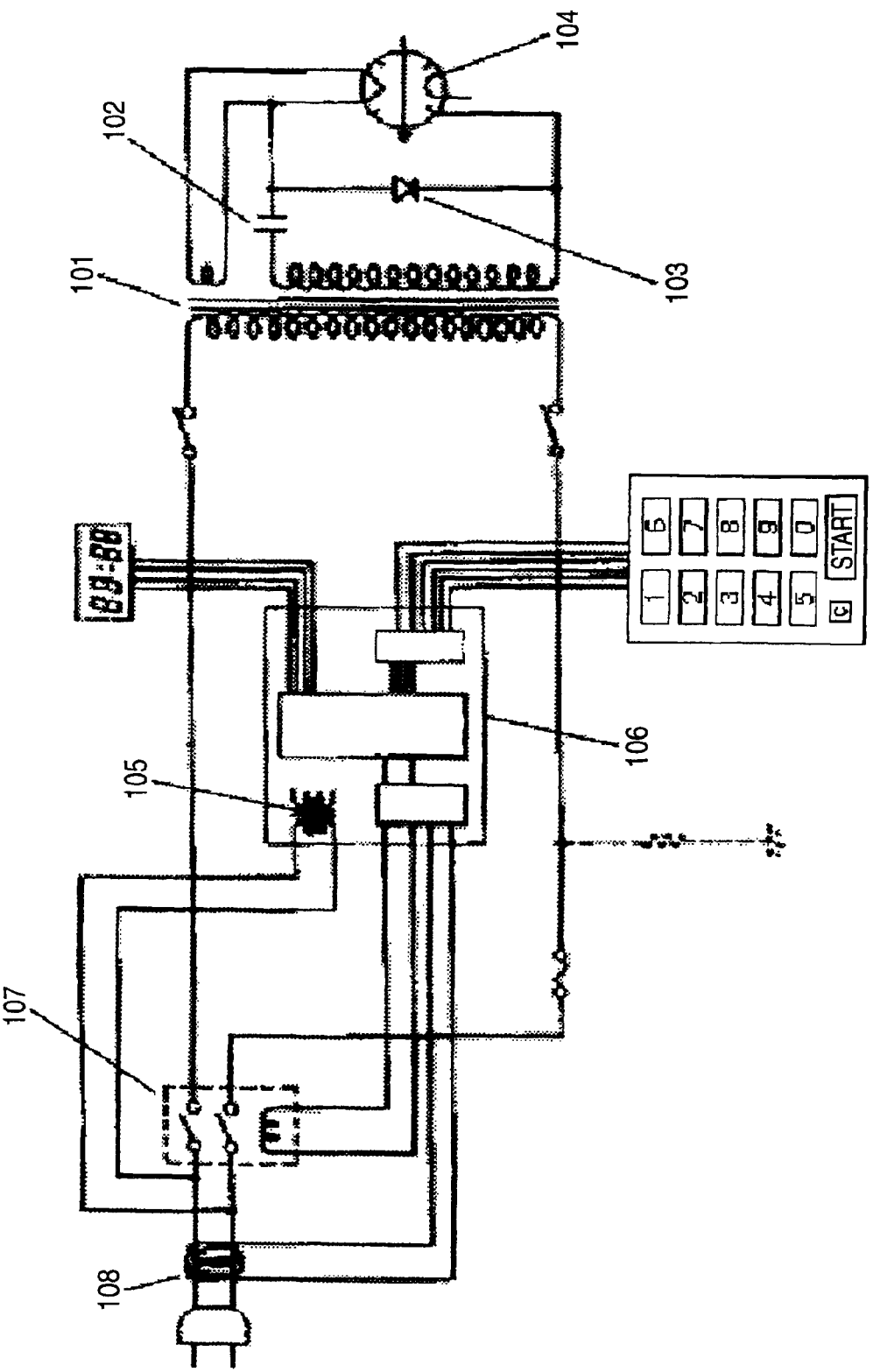
FIG. 11 is the circuit diagram of the conventional microwave oven.

FIG. 10 is a circuit diagram of a microwave oven in which a main switching device is provided on an electric wire to a control means. It should be noted that the same reference numerals shown in the fourth embodiment will be employed as those for denoting the similar structural elements in the sixth embodiment. A different structural point from that of the fourth embodiment is given as follows: That is, while a relay 2025 corresponding to the main switching device of the present invention is provided on an electric wire 2009a to a control means 2013, a high frequency generator 2012 corresponding to the load is connected to the electric wire 2009a via another relay 2026 and another relay 2011.

A description is made of operations and effects as to the microwave oven with employment of the above-described arrangement.

Firstly, under such a condition that the contact points of the relay 2025 are opened, no electric power is supplied to both the control means 2013 and the high frequency generator 2012, to bring the microwave oven into the standby mode. When the user uses the microwave oven, first of all, the user depresses the power ON key 2006 to close the switch 2020. Then the low voltage transformer 2014 starts to supply the electric power to the control means 2013 to operate. The microcomputer 2015 provided in the control means 2013 closes the contact points of the relay 2025, when the microcomputer 2015 judges that no earth leakage occurs on the basis of the output of the earth leakage judging means 2019. Since the contact points of the relay 2025 are closed, the electric power is subsequently supplied to the control means 2013, so that the operation thereof is continued.

Next, the user enters both a cooking mode and a heating time with the keyboard 2005, and also, enters a start command with the keyboard 2005, so that a relay driving unit 2021d closes the contact point of the relay 2011 and the contact point of the relay 2026 in response to the output from the microcomputer 2015. As a consequence, the electric power is supplied to the high frequency generator 2012 so as to generate microwaves and heat the food. When the cooking is ended, the microcomputer 2015 opens the contact point of the relay 2011 and the contact point of the relay 2026. When all of the cooking are accomplished and then the microwave oven transfers into the standby mode, the user enters a power OFF command with the keyboard 2005 to open the contact points of the relay 2025, which brings the microwave oven into the standby mode.

Alternatively, in order to avoid such a cumbersome inputting operation of the power OFF command, or in case that the user forgets to enter the power OFF command after using the microwave oven, for instance, while such a waiting time is provided which does not cause the user to have an inconvenient feeling as to the input operation of the keyboard 2005, the microwave oven may be provided with an automatic power OFF function, namely, when the user does nothing during this waiting time, the microcomputer 2015 may open the contact points of the relay 2025 to bring the microwave oven into the standby mode.

Also, in the case that the earth leakage judging means 2019 judges an occurrence of earth leakage while the contact points of the relay 2010 are closed, the microcomputer 2015 immediately turns OFF the contact points of the relay 2025 to improve security.

Also, in the case that the earth leakage judging means 2019 judges an occurrence of earth leakage during high frequency heating operation, the microcomputer 2015 opens the relays 2011 and 2026 to stop energizing the high frequency generator 2012, and also causes the display unit 2004 to display thereon an error indication. Moreover, even when the energizing operation to the high frequency generator 2012 is stopped, when the earth leakage judging means 2019 judges that earth leakage occurs, the microcomputer 2015 opens the relay 2025 to stop the microwave oven.

As previously described, in the sixth embodiment, when the microwave oven is in the standby mode, the main switching device cuts off the electric wire to the control means, and also, another switching device such as a relay cuts off the load from the electric wire. As a result, the risk of either the earth leakage or the electric shock can be reduced, and also, without no unnecessary power consumption, the standby power can be reduced.

While the present invention has been described in detail, or with reference to the specific embodiments, it is obvious for one having ordinary skill in the art at the time to conceive that the present invention may be modified and changed without departing from the technical scope and spirit of the present invention. The present patent application claims priority from Japanese patent application JP 2006-101760 filed on Apr. 3, 2006, Japanese patent application JP 2005-338210 filed on Nov. 24, 2005, and Japanese patent application JP 2005-245618 filed on Aug. 26, 2005, the contents of which are hereby incorporated by reference into the present patent application.

Industrial Applicability

As previously described, in the electric appliance according to the present invention, the power consumption of the earth leakage detecting circuit during the standby mode can be eliminated without deteriorating the effect of the earth leakage interrupting function capable of preventing either the earth leakage or the electric shock. As a result, the electric appliance can also be applied to such a utilization field that power consumption of a domestic household appliance equipped with the earth leakage interrupting function is reduced. Also, in the heating cooking device according to the present invention, the power consumption of the earth leakage detecting circuit during the standby mode can be eliminated without deteriorating the effect of the earth leakage interrupting function capable of preventing either the earth leakage or the electric shock. As a result, the heating cooking device can also be applied to such a utilization field that power consumption of a domestic household appliance equipped with the earth leakage interrupting function is reduced, and also, another utilization field that while a domestic household appliance is newly equipped with an earth leakage interrupting function instead of the earth leakage solution provided in the conventional electric appliance, power consumption thereof during the standby mode must be decreased as small as possible.

The invention claimed is:

1. An electric appliance comprising:
an appliance main body for employing an AC power supply;
a power supply unit provided in said main body, and connected to input said AC power supply for outputting a DC supply voltage and a AC supply voltage to said appliance main body;
wherein said power supply unit includes:
a power supply circuit for converting the input AC power supply voltage into the DC power supply voltage, which is electrically insulated from said AC power supply;
a relay for turning ON and OFF a supply of the AC power supply voltage to the appliance main body; and
an earth leakage sensing circuit provided between a contact point of said relay and said appliance main body, for detecting earth leakage occurred in said appliance main body to turn OFF said relay,
wherein the appliance main body includes a control unit for controlling the electric appliance, and said control unit operates with the DC voltage applied from the power supply unit when the relay is both ON and OFF, and controls the supply of the DC voltage to both the relay and the earth leakage sensing circuit thereby selectively providing and interrupting DC power supplied to both the relay and the earth leakage sensing circuit.

2. The electric appliance as claimed in claim 1 wherein said appliance main body turns OFF said relay when the appliance main body is in a standby mode.

3. The electric appliance as claimed in claim 1 wherein, when the electric appliance is in the standby mode, said control unit stops the supply of the DC voltage to both the relay and the earth leakage sensing circuit.

4. The electric appliance as claimed in claim 1 wherein said power supply unit includes a noise filter circuit on the input side of the AC power supply, and said power supply unit is provided as a single unit.

5. A heating cooking device comprising:
a load;
a control unit for controlling said load;
a power supply unit of said control unit;
an electric power supplying unit for supplying electric power from said power supply unit to said control unit;
an initiation signal generating unit for applying a signal to said electric power supplying unit so as to commence the supply of the electric power;
an electric wire for applying a commercial power supply voltage to both said load and said power supply unit;
a current detecting unit for detecting an unbalance current flowing through said electric wire; and
an earth leakage judging unit for judging whether or not earth leakage is present on the basis of a signal output from said current detecting unit;
wherein, in a standby mode that said electric power supplying unit does not supply the electric power, the supply of the power supply voltage is commenced in response to the signal of said initiation signal generating unit, so that said control unit and said earth leakage judging unit start the operations thereof; and
wherein if the signal of said earth leakage judging unit is normal, then said electric power supplying unit continuously supplies the electric power, so that said control unit and said earth leakage judging unit continuously operate, and said electric power supplying unit stops supplying the electric power.

6. The heating cooking device as claimed in claim 5 wherein said initiation signal generating unit includes a door switch which operates in cooperation with opening/closing operations of a door.

7. A heating cooking device as claimed in claim 5 wherein said heating cooking device includes a switching device for opening/closing a connection between the load and the electric wire; and in the case that the signal of said earth leakage judging unit is not normal, said control unit opens said switching device.

8. The heating cooking device as claimed in any one of claim 7 to claim 11 wherein said heating cooking device further comprises a notifying unit; and when the signal of said earth leakage judging unit is not normal, said notifying unit notifies an occurrence of earth leakage.

9. The heating cooking device as claimed in claim 8 wherein while the occurrence of the leakage is notified, said control unit does not allow said electric power supplying unit to stop supplying the electric power.

10. The heating cooking device as claimed in claim 5 wherein said heating cooking device further comprises a power switch having a reset function, for opening/closing a connection between the load and the power supply unit; and in the case that the signal of said earth leakage judging unit is not normal, said control unit opens said power switch.

11. The heating cooking device as claimed in claim 5 wherein
said heating cooking device includes:
a power switch having a reset function, for opening/closing a connection between the load and the power supply unit; and a switching device for opening/closing a connection between the load and the electric wire; and
wherein:
in the case that the signal of said earth leakage judging unit is not normal, said control unit opens said switching device, and thereafter, when the signal of said earth leakage judging unit is not further normal, the control unit opens said power switch.

12. An electric appliance comprising:
a load;
a control unit for controlling said load;
an electric wire connecting said load and said control unit in parallel and applying a power supply voltage to both said load and said control unit simultaneously;
a current detecting unit for detecting an unbalance current flowing through said electric wire;
an earth leakage judging unit for judging whether or not earth leakage is present based upon a signal output from said current detecting unit and outputting a corresponding judgment signal to said control unit;

a main switching device for opening/closing said electric wire so as to simultaneously apply the power supply voltage to both said load and said control unit when closed; and a switch connected parallel to said main switching device; wherein:

during such a standby mode that said main switching device is opened, said switch is closed to commence to supply the power supply voltage, so that said control unit commences to operate; when said earth leakage judging unit judges that earth leakage does not occur, since the control unit closes said main switching device, even when the switch is opened, the control unit continues to operate, and the control unit opens said main switching device to transfer into the standby mode.

13. The electric appliance as claimed in claim 12 wherein in the case that said earth leakage judging unit judges that the earth leakage occurs, said control unit opens said main switching device.

14. The electric appliance as claimed in claim 12 wherein in the case that there is no status transition for a predetermined time, said control unit opens said main switching device.

15. The electric appliance as claimed in claim 14 wherein even when said predetermined time has not yet elapsed, in such a case that said earth leakage judging unit judges that the earth leakage occurs, said control unit opens the main switching device.

16. The electric appliance as claimed in claim 12, or claim 15 wherein said control unit further comprises a notifying unit; and wherein in the case that said earth leakage judging unit judges that the earth leakage occurs, said control means performs notification, and opens said main switching device.

17. The electric appliance as claimed in claim 12 wherein said control unit further comprises a storage unit; and in the case that said earth leakage judging unit judges that the earth leakage occurs, since the information of said earth leakage is stored in the storage unit, said information is derived from said control unit.

18. The electric appliance as claimed in claim 12 wherein said control unit further comprises a storage unit, and a notifying unit; and in the case that said earth leakage judging unit judges that the earth leakage occurs, said control unit stores the information of said earth leakage in the storage unit, and even when said earth leakage judging unit judges that the earth leakage does not occur, said information of the earth leakage stored in the storage unit is notified.

19. The electric appliance as claimed in claim 12 wherein said control unit further comprises a microcomputer; and said microcomputer is equipped with an examination program for operating the load connected to the electric wire under a predetermined condition so as to check whether or not the judgement made by said earth leakage judging unit is normal, and said microcomputer executes the examination program by a predetermined operation.

20. The electric appliance as claimed in claim 19 wherein said control unit further comprises a notifying unit; and a result of executing said examination program is notified by said notifying unit.

* * * * *